United States Patent
Osman et al.

(10) Patent No.: US 10,543,430 B2
(45) Date of Patent: Jan. 28, 2020

(54) EXPANDED FIELD OF VIEW RE-RENDERING FOR VR SPECTATING

(71) Applicant: Sony Interactive Entertainment Inc., Tokyo (JP)

(72) Inventors: Steven Osman, San Francisco, CA (US); Dominic Mallinson, Redwood City, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 850 days.

(21) Appl. No.: 15/181,266

(22) Filed: Jun. 13, 2016

(65) Prior Publication Data

US 2016/0361658 A1 Dec. 15, 2016

Related U.S. Application Data

(60) Provisional application No. 62/175,278, filed on Jun. 14, 2015.

(51) Int. Cl.
*A63F 13/86* (2014.01)
*A63F 13/355* (2014.01)
(Continued)

(52) U.S. Cl.
CPC ............ *A63F 13/86* (2014.09); *A63F 13/26* (2014.09); *A63F 13/355* (2014.09); *A63F 13/525* (2014.09); *A63F 13/213* (2014.09)

(58) Field of Classification Search
None
See application file for complete search history.

(56) References Cited

U.S. PATENT DOCUMENTS 8,613,673 B2 * 12/2013 Perry ............... A63F 13/30 463/42
9,084,938 B2 * 7/2015 Osman ............... A63F 13/12
(Continued)

FOREIGN PATENT DOCUMENTS

CA 2798934 A1 6/2014
JP 2014525049 A 9/2014
(Continued)

OTHER PUBLICATIONS

Office Action issued in related Japanese Patent Application No. 2018-516408, dated Jan. 8, 2019 (8 total pages).
(Continued)

*Primary Examiner* — Tramar Y Harper
(74) *Attorney, Agent, or Firm* — Penilla IP, APC

(57) ABSTRACT

A method is provided: comprising: receiving, by a gaming server, game state data from a player client device, the game state data being defined from a game state of a first instance of a video game that is executed by the player client device; applying, by the gaming server, the received game state data and the view direction data to a second instance of the video game that is executed by the gaming server, to generate a wide field of view (FOV) spectator video; receiving, by a video server, view direction data from a spectator client device, the view direction data being determined from a tracked pose of a head-mounted display (HMD); applying, by the video server, the view direction data to define a portion of the wide FOV spectator video, the portion of the wide FOV spectator video identifying a sub-area of the wide FOV spectator video that is less than an entire area of the wide FOV spectator video; streaming the portion of the wide FOV spectator video to the spectator client device for rendering on the HMD.

20 Claims, 10 Drawing Sheets

(51) Int. Cl.
*A63F 13/525* (2014.01)
*A63F 13/26* (2014.01)
*A63F 13/213* (2014.01)

(56) References Cited

U.S. PATENT DOCUMENTS

| | | | | |
|---|---|---|---|---|
| 9,656,160 B2* | 5/2017 | Perry | | A63F 13/12 |
| 2003/0038805 A1* | 2/2003 | Wong | | A63F 13/12 |
| | | | | 345/473 |
| 2007/0117617 A1* | 5/2007 | Spanton | | A63F 13/12 |
| | | | | 463/29 |
| 2007/0117635 A1* | 5/2007 | Spanton | | A63F 13/12 |
| | | | | 463/43 |
| 2009/0209347 A1* | 8/2009 | Roberts | | A63F 13/12 |
| | | | | 463/40 |
| 2009/0209348 A1* | 8/2009 | Roberts | | A63F 13/12 |
| | | | | 463/40 |
| 2013/0083173 A1* | 4/2013 | Geisner | | G06F 3/013 |
| | | | | 348/51 |
| 2014/0004951 A1* | 1/2014 | Kern | | A63F 13/86 |
| | | | | 463/42 |
| 2014/0113718 A1* | 4/2014 | Norman | | A63F 13/12 |
| | | | | 463/31 |
| 2014/0361956 A1* | 12/2014 | Mikhailov | | G02B 27/0179 |
| | | | | 345/8 |
| 2014/0361977 A1 | 12/2014 | Stafford et al. | | |
| 2014/0364209 A1* | 12/2014 | Perry | | G06F 3/013 |
| | | | | 463/31 |
| 2015/0141145 A1 | 5/2015 | Perlman et al. | | |
| 2016/0282619 A1* | 9/2016 | Oto | | G02B 27/017 |

FOREIGN PATENT DOCUMENTS

WO  2014197876 A2  12/2014
WO  WO-2015056369 A1 *  4/2015 ............ A63F 13/86

OTHER PUBLICATIONS

Office Action issued in related European Patent Application No. 16733255.0, dated Mar. 7, 2019 (8 pages).
PCT/2016/037287 International Search Report and the Written Opinion dated Sep. 5, 2016, 14 pages.

* cited by examiner

EXPANDED FIELD OF VIEW RE-RENDERING FOR VR SPECTATING

CLAIM OF PRIORITY

This application claims priority to U.S. Provisional Application No. 62/175,278, filed Jun. 14, 2015, entitled "Wide Field of View Re-rendering for VR Spectating," the disclosure of which is incorporated by reference herein.

BACKGROUND

1. Field of the Disclosure

The present disclosure relates to providing an expanded field of view re-rendering of a video game for virtual reality (VR) spectating on a head-mounted display (HMD), and associated apparatus and methods.

2. Description of the Related Art

The video game industry has seen many changes over the years. As computing power has expanded, developers of video games have likewise created game software that takes advantage of these increases in computing power. To this end, video game developers have been coding games that incorporate sophisticated operations and mathematics to produce very detailed and engaging gaming experiences.

Example gaming platforms include the Sony Playstation®, Sony Playstation2® (PS2), Sony Playstation3® (PS3), and Sony Playstation4® (PS4), each of which is sold in the form of a game console. As is well known, the game console is designed to connect to a display (typically a television) and enable user interaction through handheld controllers. The game console is designed with specialized processing hardware, including a CPU, a graphics synthesizer for processing intensive graphics operations, a vector unit for performing geometry transformations, and other glue hardware, firmware, and software. The game console may be further designed with an optical disc reader for receiving game discs for local play through the game console. Online gaming is also possible, where a user can interactively play against or with other users over the Internet. As game complexity continues to intrigue players, game and hardware manufacturers have continued to innovate to enable additional interactivity and computer programs.

A growing trend in the computer gaming industry is to develop games that increase the interaction between the user and the gaming system. One way of accomplishing a richer interactive experience is to use wireless game controllers whose movement is tracked by the gaming system in order to track the player's movements and use these movements as inputs for the game. Generally speaking, gesture input refers to having an electronic device such as a computing system, video game console, smart appliance, etc., react to some gesture made by the player and captured by the electronic device.

Another way of accomplishing a more immersive interactive experience is to use a head-mounted display. A head-mounted display is worn by the user and can be configured to present various graphics, such as a view of a virtual space. The graphics presented on a head-mounted display can cover a large portion or even all of a user's field of view. Hence, a head-mounted display can provide a visually immersive experience to the user.

Another growing trend in the industry involves the development of cloud-based gaming systems. Such systems may include a remote processing server that executes a game application, and communicates with a local thin client that can be configured to receive input from users and render video on a display. In some implementations, the remote processing server can include the physical hardware of a gaming console, or such hardware that replicates that of a gaming console. In other implementations, the remote processing server may define a virtual machine that emulates the hardware of a gaming console.

It is in this context that embodiments of the disclosure arise.

SUMMARY

Implementations of the present disclosure include methods and systems that are used for providing a wide field of view re-rendering of a video game for virtual reality (VR) spectating on a head-mounted display (HMD).

When viewing a playback video of a user's gameplay, the spectator typically views a video that has been generated and recorded from the perspective of the original player. However, devices such as HMD's afford freedom of movement to the spectator and also provide for movement tracking, which are not utilized when spectating a typical playback video. However, in accordance with implementations of the disclosure, a custom build of a game engine is provided that executes on a cloud server (e.g. on game console hardware in the cloud), and which accepts as input game state streamed from the player's game engine, and which uses the game state to render a wide field of view (e.g. 150 degrees or greater) of the game. The wide field of view rendering may then be used for real-time streaming and/or pre-recorded playback of the game session. In accordance with some implementations of the disclosure, the actual game can be modified to stream its state to the networked version of the game engine.

Implementations of the present disclosure provide several advantages over existing methods and systems, including the following benefits. The game engine can stream its own state to a copy of the game engine running on the cloud with minimal conversion, and therefore the internal states of the player's game engine and the cloud-based game engine can be consistent. The player of the VR game can expect little interruption or degradation to his experience because his game engine is simply sending updates over the network, which requires minimal amounts the player machine's resources, and aside from the sending of updates, the player's copy of the game can be wholly dedicated to optimizing the player's experience.

The server-based code which is a custom build of the game engine is best suited to faithfully reproduce the game for a replay, because it is the actual engine used in the game. The server-based code can, if necessary, take longer than the player's copy of the game to perform its rendering because it does not affect the quality of the player's experience. In fact, the quality of the spectator rendering can surpass that of the original player's rendering, as the server-based code does not need to be subject to the same real-time rendering constraints that applied to the original player's rendering process, and may also be afforded greater processing resources and/or additional processing cycles. Further, because the client and the server are configured to execute essentially the same game (but different versions), development costs to implement high quality streaming can be reduced.

In accordance with some implementations, a method is provided, including the following operations: receiving, by a gaming server, game state data from a player client device, the game state data being defined from a game state of a first instance of a video game that is executed by the player client device; applying, by the gaming server, the received game state data and the view direction data to a second instance of the video game that is executed by the gaming server, to generate a wide field of view (FOV) spectator video; receiving, by a video server, view direction data from a spectator client device, the view direction data being determined from a tracked pose of a head-mounted display (HMD); applying, by the video server, the view direction data to identify a portion of the wide FOV spectator video, the portion of the wide FOV spectator video being a sub-area of the wide FOV spectator video that is less than an entire area of the wide FOV spectator video; streaming the portion of the wide FOV spectator video to the spectator client device for rendering on the HMD.

In some implementations, the game state data includes one or more of, input data defined from a controller device that is in communication with the player client device, one or more values of one or more game state variables, a random or pseudo-random seed, updates to a state of an object or property.

In some implementations, applying the game state data to the second instance of the video game produces a game state of the second instance of the video game that is substantially similar to the game state of the first instance of the video game.

In some implementations, the wide FOV spectator video has a field of view that is greater than a field of view of a primary video that was rendered from the first instance of the video game by the player client device.

In some implementations, the view direction data identifies an orientation of the HMD in a spectator environment in which the HMD is disposed.

In some implementations, the tracked pose of the HMD is determined from at least one inertial sensor of the HMD and/or from analysis of captured images of the spectator environment.

In some implementations, wherein the wide FOV spectator video is stored to a storage device; wherein applying the view direction data includes retrieving the wide FOV spectator video from the storage device.

In some implementations, the operations of the method are performed in substantial real-time, so that the rendering of the portion of the wide FOV spectator video on the HMD enables substantially live spectating of the first instance of the video game.

In accordance with some implementations, a method is provided, including: receiving, by a gaming server, game state data from a player client device, the game state data being defined from a game state of a first instance of a video game that is executed by the player client device; receiving, by the gaming server, view direction data from a spectator client device, the view direction data being determined from a tracked pose of a head-mounted display (HMD); applying, by the gaming server, the received game state data and the view direction data to a second instance of the video game that is executed by the gaming server, to generate a spectator video; streaming the spectator video to the spectator client device for rendering on the HMD.

In some implementations, the game state data includes one or more of, input data defined from a controller device that is in communication with the player client device, one or more values of one or more game state variables, a random or pseudo-random seed, updates to a state of an object or property.

In some implementations, applying the game state data to the second instance of the video game produces a game state of the second instance of the video game that is substantially similar to the game state of the first instance of the video game.

In some implementations, the spectator video has a field of view that is greater than a field of view of a primary video that was rendered from the first instance of the video game by the player client device.

In some implementations, the view direction data identifies an orientation of the HMD in a spectator environment in which the HMD is disposed.

In some implementations, the tracked pose of the HMD is determined from at least one inertial sensor of the HMD and/or from analysis of captured images of the spectator environment.

In some implementations, operations of the method are performed in substantial real-time, so that the rendering of the spectator video on the HMD enables substantially live spectating of the first instance of the video game.

In accordance with some implementations, a system is provided, including: at least one server computer having at least one processor and at least one memory, the at least one server computer including a gaming server and a video server; wherein the gaming server is configured to receive game state data from a player client device, the game state data being defined from a game state of a first instance of a video game that is executed by the player client device; wherein the gaming server is further configured to apply the received game state data and the view direction data to a second instance of the video game that is executed by the gaming server, to generate a wide field of view (FOV) spectator video; wherein the video server is configured to receive view direction data from a spectator client device, the view direction data being determined from a tracked pose of a head-mounted display (HMD); wherein the video server is further configured to apply the view direction data to identify a portion of the wide FOV spectator video, the portion of the wide FOV spectator video being a sub-area of the wide FOV spectator video that is less than an entire area of the wide FOV spectator video; wherein the video server is further configured to stream the portion of the wide FOV spectator video to the spectator client device for rendering on the HMD.

In some implementations, the game state data includes one or more of, input data defined from a controller device that is in communication with the player client device, one or more values of one or more game state variables, a random or pseudo-random seed, updates to a state of an object or property.

In some implementations, applying the game state data to the second instance of the video game produces a game state of the second instance of the video game that is substantially similar to the game state of the first instance of the video game.

In some implementations, the wide FOV spectator video has a field of view that is greater than a field of view of a primary video that was rendered from the first instance of the video game by the player client device.

In some implementations, the view direction data identifies an orientation of the HMD in a spectator environment in which the HMD is disposed; wherein the tracked pose of the HMD is determined from at least one inertial sensor of the HMD and/or from analysis of captured images of the spectator environment.

Other aspects and advantages of the disclosure will become apparent from the following detailed description, taken in conjunction with the accompanying drawings, illustrating by way of example the principles of the disclosure.

BRIEF DESCRIPTION OF THE DRAWINGS

The disclosure may be better understood by reference to the following description taken in conjunction with the accompanying drawings in which.

DETAILED DESCRIPTION

The following implementations of the present disclosure provide methods and systems for providing a wide field of view re-rendering of a video game for virtual reality (VR) spectating on a head-mounted display (HMD).

In one embodiment, the methods, systems, image capture objects, sensors and associated interface objects (e.g., gloves) are configured to process data that is configured to be rendered in substantial real time on a display screen. The display may be the display of a head mounted display (HMD), a display of a second screen, a display of a portable device, a computer display, a display panel, a display of one or more remotely connected users (e.g., whom may be viewing content or sharing in an interactive experience), or the like.

It will be obvious, however, to one skilled in the art, that the present disclosure may be practiced without some or all of these specific details. In other instances, well known process operations have not been described in detail in order not to unnecessarily obscure the present disclosure.

Figure 1:
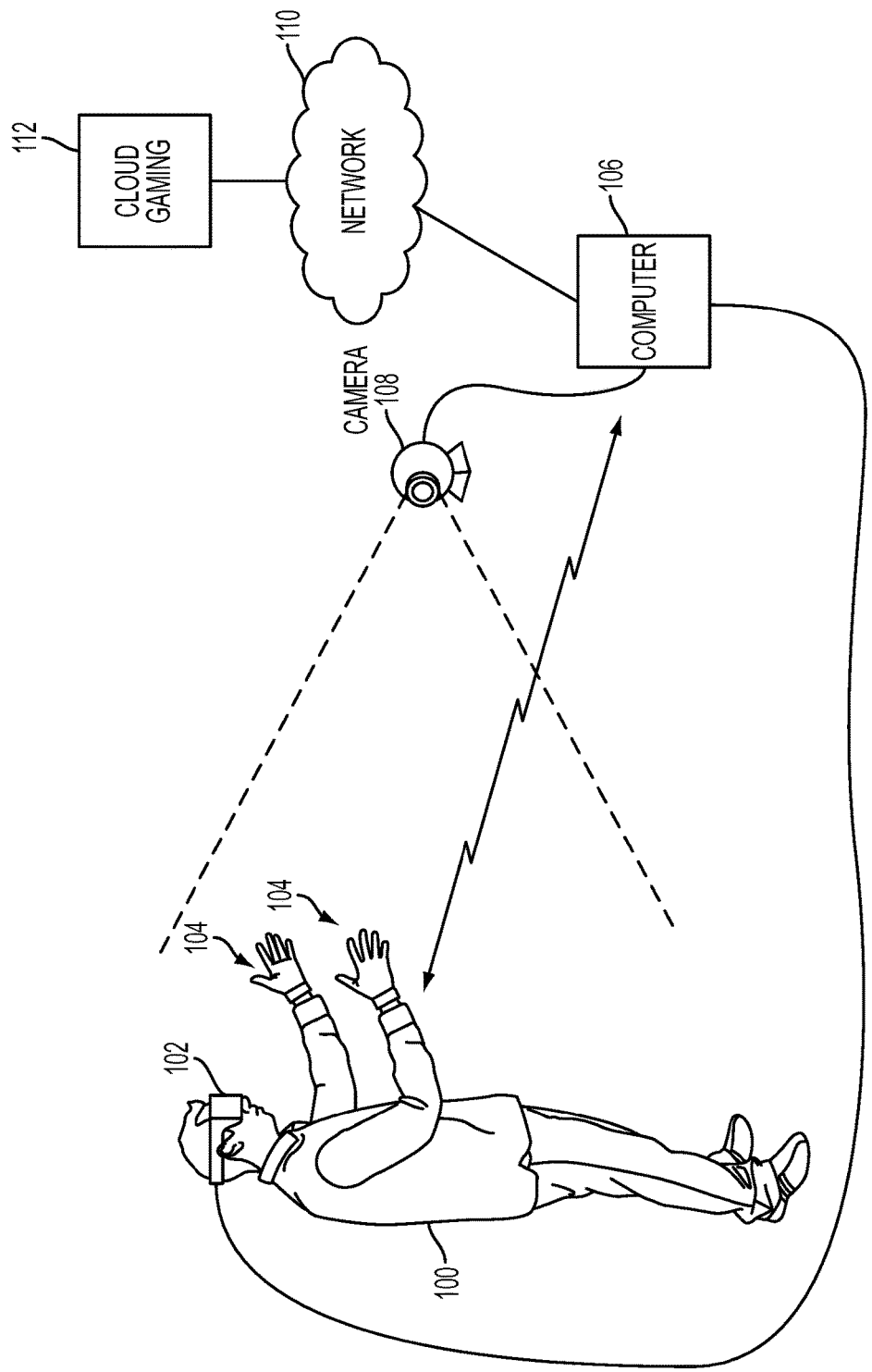
FIG. 1 illustrates a system for interactive gameplay of a video game, in accordance with an embodiment of the disclosure.

FIG. 1 illustrates a system for interactive gameplay of a video game, in accordance with an embodiment of the disclosure. A user 100 is shown wearing a head-mounted display (HMD) 102. The HMD 102 is worn in a manner similar to glasses, goggles, or a helmet, and is configured to display a video game or other content to the user 100. The HMD 102 provides a very immersive experience to the user by virtue of its provision of display mechanisms in close proximity to the user's eyes. Thus, the HMD 102 can provide display regions to each of the user's eyes which occupy large portions or even the entirety of the field of view of the user.

In one embodiment, the HMD 102 can be connected to a computer 106. The connection to computer 106 can be wired or wireless. The computer 106 can be any general or special purpose computer known in the art, including but not limited to, a gaming console, personal computer, laptop, tablet computer, mobile device, cellular phone, tablet, thin client, set-top box, media streaming device, etc. In one embodiment, the computer 106 can be configured to execute a video game, and output the video and audio from the video game for rendering by the HMD 102.

The user 100 may operate a glove interface object 104 to provide input for the video game. Additionally, a camera 108 can be configured to capture images of the interactive environment in which the user 100 is located. These captured images can be analyzed to determine the location and movements of the user 100, the HMD 102, and the glove interface object 104. In one embodiment, the glove interface object 104 includes a light which can be tracked to determine its location and orientation. Additionally, the HMD 102 may include one or more lights which can be tracked to determine the location and orientation of the HMD 102. The camera 108 can include one or more microphones to capture sound from the interactive environment. Sound captured by a microphone array may be processed to identify the location of a sound source. Sound from an identified location can be selectively utilized or processed to the exclusion of other sounds not from the identified location. Furthermore, the camera 108 can be defined to include multiple image capture devices (e.g. stereoscopic pair of cameras), an IR camera, a depth camera, and combinations thereof.

In another embodiment, the computer 106 functions as a thin client in communication over a network with a cloud gaming provider 112. The cloud gaming provider 112 maintains and executes the video game being played by the user 102. The computer 106 transmits inputs from the HMD 102, the glove interface object 104 and the camera 108, to the cloud gaming provider, which processes the inputs to affect the game state of the executing video game. The output from the executing video game, such as video data, audio data, and haptic feedback data, is transmitted to the computer 106. The computer 106 may further process the data before transmission or may directly transmit the data to the relevant devices. For example, video and audio streams are provided to the HMD 102, whereas a vibration feedback command is provided to the glove interface object 104.

In one embodiment, the HMD 102, glove interface object 104, and camera 108, may themselves be networked devices that connect to the network 110 to communicate with the cloud gaming provider 112. For example, the computer 106 may be a local network device, such as a router, that does not otherwise perform video game processing, but which facilitates passage of network traffic. The connections to the network by the HMD 102, glove interface object 104, and camera 108 may be wired or wireless.

Additionally, though embodiments in the present disclosure may be described with reference to a head-mounted display, it will be appreciated that in other embodiments, non-head mounted displays may be substituted, including without limitation, a television, projector, LCD display screen, portable device screen (e.g. tablet, smartphone, laptop, etc.) or any other type of display that can be configured to render video and/or provide for display of an interactive scene or virtual environment in accordance with the present embodiments.

Figure 2:
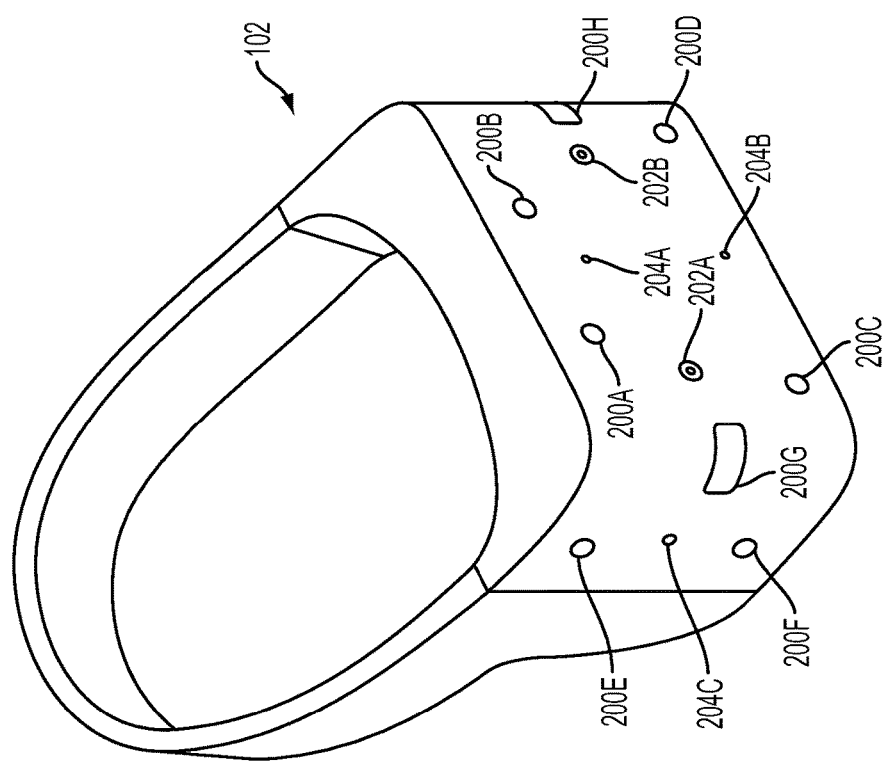
FIG. 2 illustrates a head-mounted display (HMD), in accordance with an embodiment of the disclosure.

FIG. 2 illustrates a head-mounted display (HMD), in accordance with an embodiment of the disclosure. As shown, the HMD 102 includes a plurality of lights 200A-H. Each of these lights may be configured to have specific shapes, and can be configured to have the same or different colors. The lights 200A, 200B, 200C, and 200D are arranged on the front surface of the HMD 102. The lights 200E and 200F are arranged on a side surface of the HMD 102. And the lights 200G and 200H are arranged at corners of the HMD 102, so as to span the front surface and a side surface of the HMD 102. It will be appreciated that the lights can be identified in captured images of an interactive environment in which a user uses the HMD 102. Based on identification and tracking of the lights, the location and orientation of the HMD 102 in the interactive environment can be determined. It will further be appreciated that some of the lights may or may not be visible depending upon the particular orientation of the HMD 102 relative to an image capture device. Also, different portions of lights (e.g. lights 200G and 200H) may be exposed for image capture depending upon the orientation of the HMD 102 relative to the image capture device.

In one embodiment, the lights can be configured to indicate a current status of the HMD to others in the vicinity. For example, some or all of the lights may be configured to have a certain color arrangement, intensity arrangement, be configured to blink, have a certain on/off configuration, or other arrangement indicating a current status of the HMD 102. By way of example, the lights can be configured to display different configurations during active gameplay of a video game (generally gameplay occurring during an active timeline or within a scene of the game) versus other non-active gameplay aspects of a video game, such as navigating menu interfaces or configuring game settings (during which the game timeline or scene may be inactive or paused). The lights might also be configured to indicate relative intensity levels of gameplay. For example, the intensity of lights, or a rate of blinking, may increase when the intensity of gameplay increases. In this manner, a person external to the user may view the lights on the HMD 102 and understand that the user is actively engaged in intense gameplay, and may not wish to be disturbed at that moment.

The HMD 102 may additionally include one or more microphones. In the illustrated embodiment, the HMD 102 includes microphones 204A and 204B defined on the front surface of the HMD 102, and microphone 204C defined on a side surface of the HMD 102. By utilizing an array of microphones, sound from each of the microphones can be processed to determine the location of the sound's source. This information can be utilized in various ways, including exclusion of unwanted sound sources, association of a sound source with a visual identification, etc.

The HMD 102 may also include one or more image capture devices. In the illustrated embodiment, the HMD 102 is shown to include image capture devices 202A and 202B. By utilizing a stereoscopic pair of image capture devices, three-dimensional (3D) images and video of the environment can be captured from the perspective of the HMD 102. Such video can be presented to the user to provide the user with a "video see-through" ability while wearing the HMD 102. That is, though the user cannot see through the HMD 102 in a strict sense, the video captured by the image capture devices 202A and 202B can nonetheless provide a functional equivalent of being able to see the environment external to the HMD 102 as if looking through the HMD 102. Such video can be augmented with virtual elements to provide an augmented reality experience, or may be combined or blended with virtual elements in other ways.

Though in the illustrated embodiment, two cameras are shown on the front surface of the HMD 102, it will be appreciated that there may be any number of externally facing cameras installed on the HMD 102, oriented in any direction. For example, in another embodiment, there may be cameras mounted on the sides of the HMD 102 to provide additional panoramic image capture of the environment.

Figure 3:
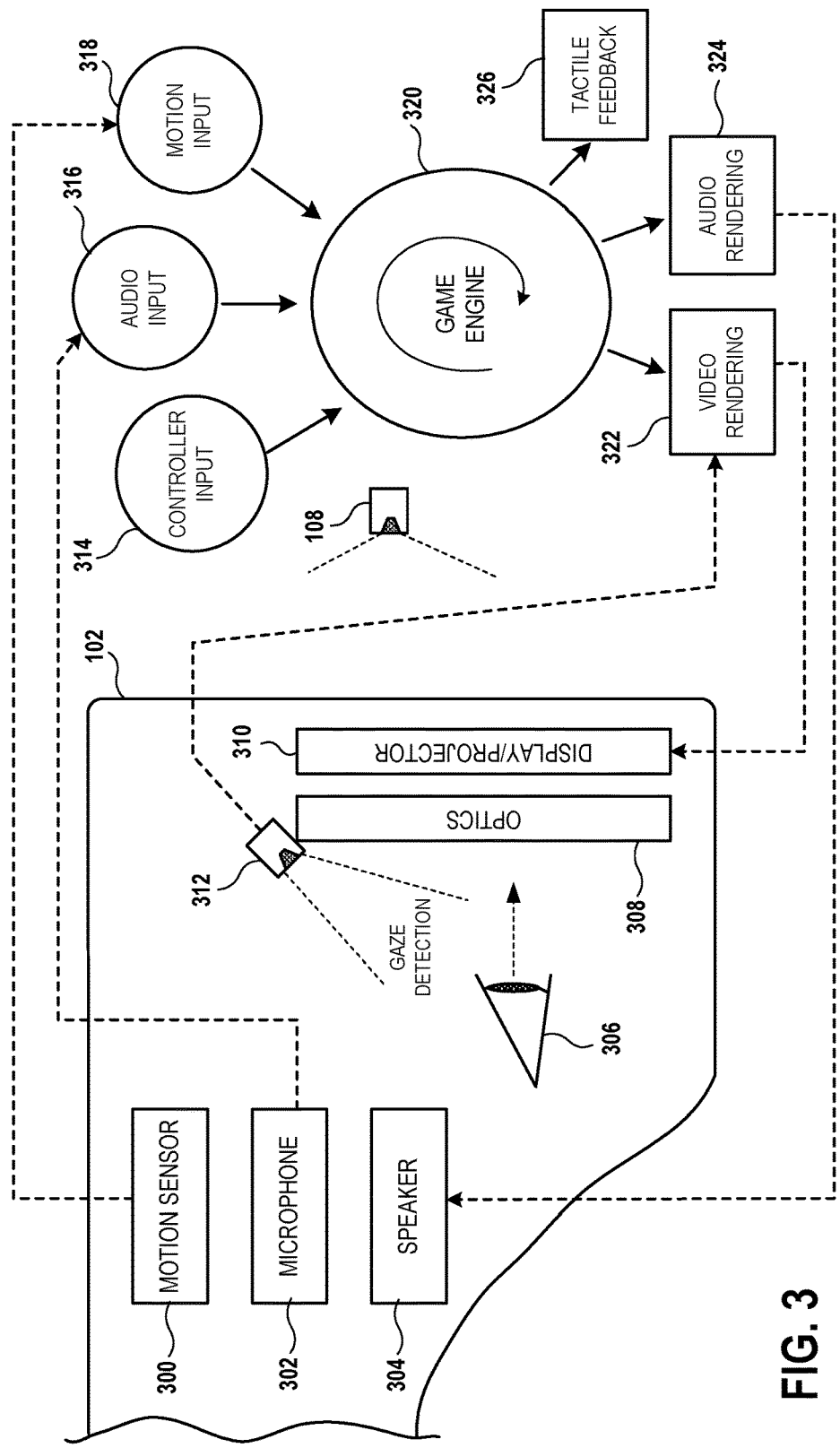
FIG. 3 conceptually illustrates the function of a HMD in conjunction with an executing video game, in accordance with an embodiment of the disclosure.

FIG. 3 conceptually illustrates the function of the HMD 102 in conjunction with an executing video game, in accordance with an embodiment of the disclosure. The executing video game is defined by a game engine 320 which receives inputs to update a game state of the video game. The game state of the video game can be defined, at least in part, by values of various parameters of the video game which define various aspects of the current gameplay, such as the presence and location of objects, the conditions of a virtual environment, the triggering of events, user profiles, view perspectives, etc.

In the illustrated embodiment, the game engine receives, by way of example, controller input 314, audio input 316 and motion input 318. The controller input 314 may be defined from the operation of a gaming controller separate from the HMD 102, such as a handheld gaming controller (e.g. Sony DUALSHOCK®4 wireless controller, Sony Playstation®Move motion controller) or glove interface object 104. By way of example, controller input 314 may include directional inputs, button presses, trigger activation, movements, gestures, or other kinds of inputs processed from the operation of a gaming controller. The audio input 316 can be processed from a microphone 302 of the HMD 102, or from a microphone included in the image capture device 108 or elsewhere in the local environment. The motion input 318 can be processed from a motion sensor 300 included in the HMD 102, or from image capture device 108 as it captures images of the HMD 102. The game engine 320 receives inputs which are processed according to the configuration of the game engine to update the game state of the video game. The game engine 320 outputs game state data to various rendering modules which process the game state data to define content which will be presented to the user.

In the illustrated embodiment, a video rendering module 322 is defined to render a video stream for presentation on the HMD 102. The video stream may be presented by a display/projector mechanism 310, and viewed through optics 308 by the eye 306 of the user. An audio rendering module 304 is configured to render an audio stream for listening by the user. In one embodiment, the audio stream is output through a speaker 304 associated with the HMD 102. It should be appreciated that speaker 304 may take the form of an open air speaker, headphones, or any other kind of speaker capable of presenting audio.

In one embodiment, a gaze tracking camera 312 is included in the HMD 102 to enable tracking of the gaze of the user. The gaze tracking camera captures images of the user's eyes, which are analyzed to determine the gaze direction of the user. In one embodiment, information about the gaze direction of the user can be utilized to affect the video rendering. For example, if a user's eyes are determined to be looking in a specific direction, then the video rendering for that direction can be prioritized or emphasized, such as by providing greater detail or faster updates in the region where the user is looking. It should be appreciated that the gaze direction of the user can be defined relative to the head mounted display, relative to a real environment in which the user is situated, and/or relative to a virtual environment that is being rendered on the head mounted display.

Broadly speaking, analysis of images captured by the gaze tracking camera 312, when considered alone, provides for a gaze direction of the user relative to the HMD 102. However, when considered in combination with the tracked location and orientation of the HMD 102, a real-world gaze direction of the user can be determined, as the location and orientation of the HMD 102 is synonymous with the location and orientation of the user's head. That is, the real-world gaze direction of the user can be determined from tracking the positional movements of the user's eyes and tracking the location and orientation of the HMD 102. When a view of a virtual environment is rendered on the HMD 102, the real-world gaze direction of the user can be applied to determine a virtual world gaze direction of the user in the virtual environment.

Additionally, a tactile feedback module 326 is configured to provide signals to tactile feedback hardware included in either the HMD 102 or another device operated by the user, such as a controller 104. The tactile feedback may take the form of various kinds of tactile sensations, such as vibration feedback, temperature feedback, pressure feedback, etc.

At present, streaming services for sharing game replays are very popular. The DualShock®4 wireless controller includes a "share button" directly on the controller to enable such sharing Implementations of the present disclosure improve sharing replays for people who wish to explore the replays using an HMD/VR headset Implementations of the present disclosure provide for rendering of a game replay with a very wide field of view to allow the spectator to move his head freely using an HMD and view the replay from novel vantage points. The traditional streaming approach would limit the replay to only what the original player viewed, so that the view direction would be independent of the spectator's head position and orientation, and if the spectator using an HMD moved his head, nothing would change.

Implementations of the disclosure provide for the rendering of videos in a wide enough field of view to support novel viewpoints in an HMD. A custom build of a game engine that runs on a cloud server (e.g. on console gaming hardware, e.g. PlayStation®4 hardware, in the cloud), that accepts as input game state streamed from the original player's game engine and uses it to render an extremely wide field of view (e.g. 150 degree plus) view of the game, that can then be used for real-time streaming and/or pre-recorded playback of that game session. It will be appreciated that the extremely wide field of view is in excess of the HMD's field of view, allowing for the spectator wearing the HMD to look around in the replay. The actual game is configured to stream its state to the networked version of the engine.

Figure 4:
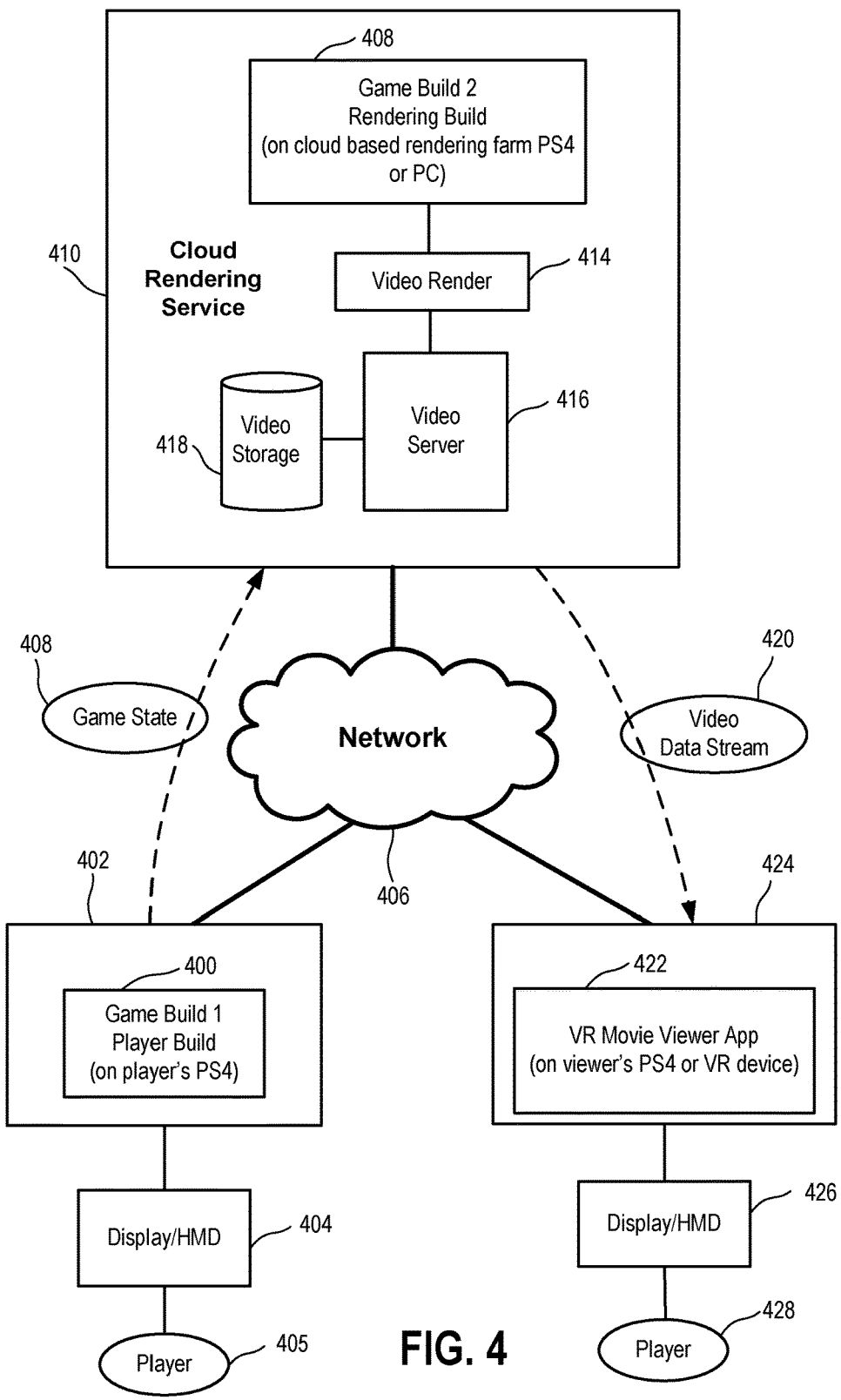
FIG. 4 illustrates a system for providing wide field of view (FOV) re-rendering for spectating on a head-mounted display (HMD).

FIG. 4 illustrates a system for providing wide field of view (FOV) re-rendering of a player's gameplay video for spectating on a head-mounted display (HMD).

A player's video game build 400 is executed by a player computing device 402 for interactive gameplay by a player 405. The player computing device 402 can be a console gaming device (e.g. PlayStation®4), personal computer, laptop, set-top box, portable gaming device (e.g. PlayStation®Vita), tablet, smartphone, or any other computing device having at least a processor and memory that may be configured to execute a video game. The player computing device 402 may be connected to a display device 404, upon which the gameplay video of the player's video game build is rendered. In various implementations, the display device 404 may be a television, monitor, LCD display, HMD, or any other type of display device on which video content may be presented. In some implementations, the display device 404 is integrated with the computing device 402 (e.g. as in a laptop computer, portable gaming device, tablet, etc.).

The player's video game build 400 is used by the person playing the game. The player's video game build 400 can be configured for rendering to a television, an HMD, or any other type of display compatible with the game build 400. The game build 400 is configured to determine changes in a scene graph of the video game and stream them over a network 406. The scene graph (or game state) describes the state of the video game that defines the interactive gameplay, including the state of the game's virtual world/environment and any virtual objects/characters. It should be noted that streaming of the scene graph by the game build 400 does not entail streaming of the actual video feed of the video game, but rather the scene graph which describes the state of the virtual world of the video game.

Examples of scene graph (or game state) data 408 which can be streamed include the following: creation & destruction of objects in the virtual world (for instance, if a character is spawned in the virtual world, that information could be streamed), position and orientation of objects in the world, changes to the rendering settings of the world (e.g. though lights and particle emitters may be objects in the scene graph, there may be other effects that are not directly embedded; for instance, the player's screen may become bloody because the player is taking heavy damage).

With continued reference to FIG. 4, a cloud rendering service 410 is provided for performing a wide field of view re-rendering of a user's gameplay. The cloud rendering service 410 includes a rendering build 412, which is a build of the video game that does not require a screen or input devices to be connected or in communication. The rendering build 412 receives the game state data 408 that has been streamed from the player's game build 400 and processes the game state data 408 to generate a wide field of view video suitable for rendering on an HMD with head tracking. The wide field of view video that is rendered by the rendering build 412 is in excess of the field of view that the HMD provides, which allows for dynamic views through the HMD during playback.

The rendering build 412 of the video game need not be subject to the same constraints as the player's game build 400. For example, the rendering build 412 does not necessarily need to run in real-time, nor does it need to run on the same or similar hardware setup (e.g. game console) as the player's game build 400. The rendering build 412 can be run on a render machine with more resources than were available to the player's game build 400 during gameplay (i.e. greater than the resources of the player computing device 402).

The rendering build 412 generates the wide field of view video 414, and transmits the rendered video 414 to a video server 416. The video server 416 receives videos that have been uploaded from the rendering build 412, and serves the videos over the network 406 for viewing by one or more spectators/users 428. The wide FOV video can be stored to a video storage 418 for retrieval by the video server 416 when the spectator 428 indicates that he/she wishes to view the video. In some implementations, the wide FOV video can be served by the video server 416 in substantially real-time—that is, as the player 405 is playing the player's game build 400 of the video game, the player's game build 400 simultaneously streams the game state data 408 in real-time, the game state data 408 in turn being processed by the rendering game build 412 in real-time to generate the wide FOV video 414, and the wide FOV video 414 is streamed in real-time to the viewer application 422 for rendering to the spectator. This provides for the spectator a substantially real-time (subject to processing delays) live viewing experience of the player's gameplay as it occurs.

In other implementations, any of the operations may be performed in a non-real-time manner. For example, the game state data 408 could be stored at the player computing device 402 for transmission to the rendering game build 412 after the player's gameplay session is complete, the rendering of the wide FOV video by the rendering game build 412 may occur in a non-real-time fashion, and/or the rendered wide FOV video 414 can be stored to the video storage 418 for later retrieval.

The video server 416 can be configured to stream the wide FOV video 414 in accordance with any of various video streaming technologies. The streamed video may be encrypted as well as encoded/compressed for both security and bandwidth conservation purposes. In the illustrated implementation, the streaming of the wide FOV video 414 is defined by the generation of a video data stream 420 by the video server 416 and transmission of the video data stream 420 to a viewer application 422 for rendering of the wide FOV video to a display device 426 for viewing by a spectator 428. The viewer application 422 decrypts and/or decodes/decompresses the video data stream 420 to enable rendering of the video content of the wide FOV video 414 to the display device 426 for viewing by the spectator 428.

The viewer application 422 may execute on a viewer computing device 424. The viewer computing device 422 (e.g. a computer, gaming console, set-top box, client computer, etc.) communicates with, and renders the video content of the video data stream to, the display device 426 (e.g. LCD display, HMD, etc.). In some implementations, the viewer computing device 422 and display device 426 are integrated in a single device, whereas in other implementations, they are separate devices that are linked.

The wide FOV video 414 is rendered with a field of view that exceeds the nominal field of view available through the display device 426 for the video game. For example, in implementations wherein the display device 426 is an HMD, then the wide FOV video 414 is rendered at a field of view exceeding that of the HMD. Thus, the video content that is displayed through the display device 426 is cropped relative to the full field of view available in the wide FOV video. The cropping may be in accordance with the view direction of the spectator as determined from tracked movement of the HMD and/or spectator. Because the wide FOV video was rendered at a field of view wider than that of the HMD, the person viewing the wide FOV video can move his/her head to view different portions of the game. This allows the spectator to, for example, look off to the side and see an enemy approaching that the original game player may not have noticed.

Implementations of the present disclosure thus provide for systems and methods which allow a spectator to replay a video of another player's gameplay experience, but with the added functionality of enabling the spectator to look around and be provided with new views of the game's virtual environment. Current streaming services capture screenshots of what is currently on the player's screen and send them to the spectator, so that the spectator sees exactly what the player sees. However, the spectator is not afforded any different view than that of the original player in such systems Implementations of the present disclosure, instead of only allowing the spectator to see exactly what the first player is seeing, also allow the spectator to move their head and see additional views. In some implementations, the spectator view could also be from a different vantage point, such as a 3rd person view, e.g. from a viewpoint that follows behind the first person character.

In some implementations, the spectator viewpoint could be tethered to the location of the first player's character or viewpoint, but the spectator could also have a limited space/freedom relative to the first player's character/viewpoint within which the spectator may move. For example, the spectator location could be configured to stay within a certain predefined distance of the first player's character/viewpoint.

Figure 5:
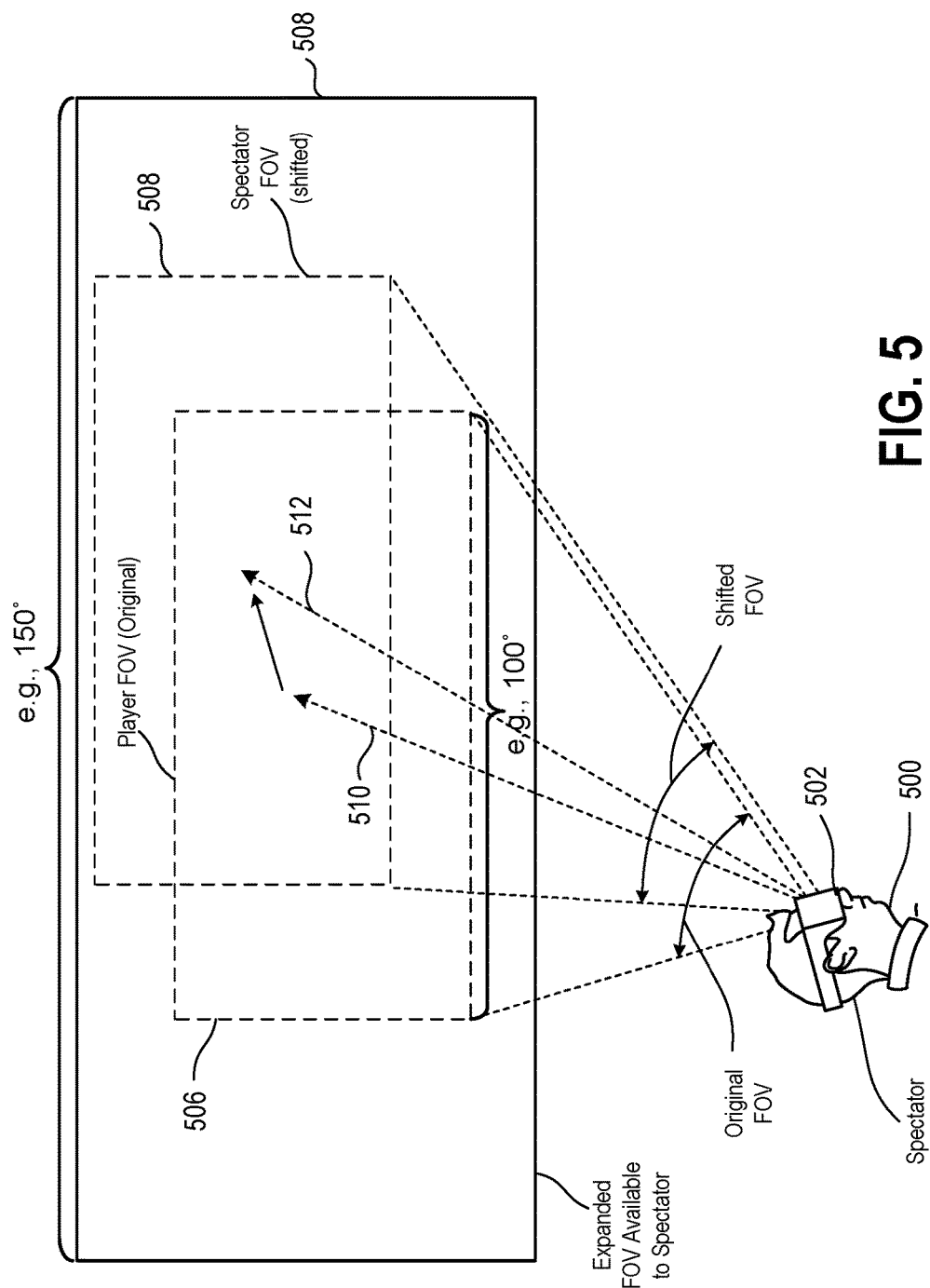
FIG. 5 illustrates an expanded field of view that is available to a spectator for viewing on a HMD.

FIG. 5 illustrates an expanded field of view that is rendered and made available for a spectator to view, in accordance with implementations of the disclosure. In the illustrated implementation, a head-mounted display (HMD) 502 provides about 100 degrees (horizontal) field of view for a spectator 500. That is, the display hardware of the HMD 502 is configured so that when the HMD is worn, the screen occupies approximately 100 degrees of the spectator's field of view. It should be appreciated that the nominal HMD field of view of approximately 100 degrees is provided by way of example only, and that in various implementations, the HMD may have greater than or less than approximately a 100 degree field of view. Regardless, the HMD has a nominal field of view that is defined by the HMD's particular display hardware configuration (e.g. display size, optics, and positioning relative to the user's eyes), and hence video content for display on the HMD that presents a view of a virtual environment of a video game can be configured to provide a field of view of the virtual environment that matches the nominal HMD field of view.

In accordance with implementations of the disclosure, the wide FOV video is rendered at a field of view that is wider than that of the HMD 502. By way of example, the wide FOV video could be rendered at approximately 150 degrees field of view, which is conceptually illustrated at reference 504. In other implementations the wide FOV video could be rendered at a field of view that is less than or greater than 150 degrees, provided that the field of view of the wide FOV video is greater than that of the HMD 502. It should be appreciated that the field of view of the video is defined by a field of view in a virtual environment of the video game from which the video is generated.

As the field of view of the video is greater than that of the HMD, then a video player/viewer (e.g. the viewer application 422) can be utilized to render the 100 degree view portion 508 from the wider 150 degree rendering 504, for display on the HMD 502 for the spectator 500 to view. It will be appreciated that in an initial state, the field of view 508 of the spectator 500 may be the same as the original field of view 506 of the original player, so that the spectator 500 sees what the original player saw during gameplay (assuming that the original player was viewing his/her gameplay on a device having substantially the same field of view capability, such as the same type of HMD device). That is, the view direction 512 of the spectator relative to the wide FOV video may coincide with the view direction 510 of the original player relative to the wide FOV video.

However, the spectator's field of view 508 may be shifted from the original player's field of view 506 in response to detected movement of the HMD 502 from its initial position. As noted, the position and movement of the HMD can be detected utilizing various technologies, including inertial sensors and visual tracking of features/objects (possibly illuminated) on the HMD 502. Thus the spectator's field of view of the wide FOV video can be shifted in response to detected changes in the pose (e.g. changes in rotation, orientation, and/or position) of the HMD. In other words, the view direction of the spectator 500 relative to the wide FOV video may deviate from the original player's view direction relative to the wide FOV video, in response to detected movements of the spectator 500 as determined by the detected movements of the HMD 502. The deviation of the view direction 512 of the spectator relative to the wide FOV video from that of the original player can be correlated to the deviation of the pose of the HMD 502 from an initial pose. Thus, as the spectator turns his head more, the spectator's view direction 512 increasingly deviates from the original view direction 510 of the original player, and the spectator's field of view 508 is thus increasingly shifted (in the direction of the deviation of the view direction) from the original player's field of view 506.

It should be appreciated that though in the described implementation, a scenario is considered wherein the original player views the video game using substantially the same type of HMD device as the spectator, in other implementations, the original player need not have viewed the original gameplay using the same type of device as the spectator. For example, the original gameplay may have been rendered on a television, in which case the original player's field of view 506 relative to the wide FOV video may be smaller than the field of view 508 of the spectator.

In some implementations, the field of view 504 of the wide FOV video is rendered to encompass the original player's field of view in a concentric manner, wherein the original player's field of view (shown at reference 506) is centrally positioned within the wider field of view 504 of the wide FOV video. That is, equivalent field of view portions would be provided on opposite sides of the original player's field of view. Again considering the horizontal field of view by way of example, then a concentric rendering would provide for equivalent additional field of view portions to be rendered to the left and to the right of the original player's field of view 506. The concept can also be applied for view portions above and below the original player's field of view. It should be appreciated that the rendering build of the video game can be configured to generate the wide FOV video in this manner.

In other embodiments, the field of view 504 of the wide FOV video can be rendered in a non-concentric manner, so that the original player's field of view 506 is not necessarily positioned at the center of the wider field of view 504 of the video. That is, non-equivalent field of view portions may be provided on opposite sides of the original player's field of view. Or in other words, the central view direction for the wide FOV video may deviate from the central view direction of the original player's field of view. For example, a field of view portion to the right of the original player's field of view might be greater than a field of view portion to the left of the original player's field of view. This may allow the spectator to see more content to the right of the original player's field of view, at the expense of being able to view as much content to the left of the original player's field of view. In this scenario, the central view direction of the wide FOV video deviates (to the right) from that of the original player's field of view.

Whether, by how much, and in what direction, to deviate from a concentric rendering scheme, can be determined by the rendering build of the video game based on the game state of the video game. In some implementations, the deviation of the central view direction for the wide FOV video from that of the original player is substantially in a direction in which the original player's field of view is/was moving during gameplay. In other words, if the original player's field of view was moving to the right in the virtual space of the video game, then the central view direction of the wide FOV video would be shifted to the right compared to the original player's view direction, thereby providing a greater field of view portion to the right, than to the left, of the original player's field of view in the rendered wide FOV video. Such a configuration may be desirable as the direction in which the original player's field of view was moving during gameplay may indicate something of interest in that direction (in this case, towards the right), and therefore the spectator may be likely to turn to see what is in that direction. In some implementations, the amount of deviation of the central view direction is based on (e.g. positively correlated to) the rate of change of the original player's the field of view.

In various implementations, any of various other game state factors may be considered to determine the deviation from a concentric rendering scheme for the wide FOV video. These may include, without limitation, activity associated with various geographic regions within the virtual space of the video game, movement of objects in the virtual space, regions or objects of interest in the virtual space, etc.

Though a wide field of view that is horizontally expanded is generally referenced herein, it will be appreciated that the wide field of view can encompass a view that is also vertically expanded. In all of the implementations described herein an expanded field of view gameplay video is contemplated that can be expanded in both horizontal and vertical directions to allow the spectator to selectively view portions of the virtual space that may not have been viewed by the original player.

Figure 6:
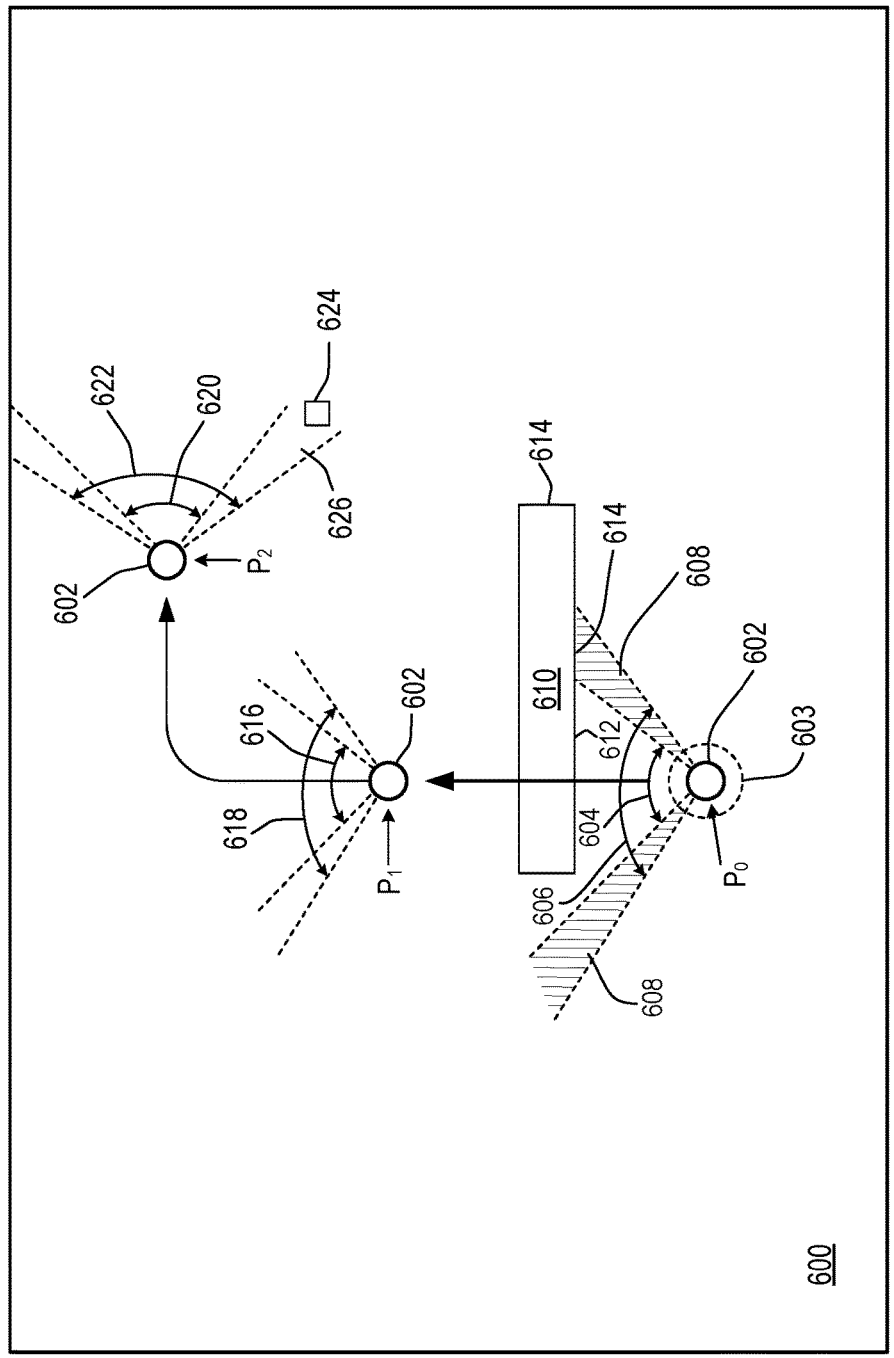
FIG. 6 illustrates an overhead view of a virtual environment of a video game, showing movement of a virtual viewpoint in the virtual environment, in accordance with implementations of the disclosure.

FIG. 6 illustrates an overhead view of a virtual environment of a video game, showing movement of a virtual viewpoint in the virtual environment, in accordance with implementations of the disclosure. At an initial time $T_0$, a virtual viewpoint 602 is defined at a position $P_0$ in the virtual environment 600. The virtual viewpoint 602 defines the location within the virtual environment 600 from which the player's view of the virtual environment 600 is presented. That is, the player's view of the virtual environment 600 is presented from the perspective of the virtual viewpoint 602. The virtual viewpoint 602 may in some implementations coincide with the location of a character, vehicle, or other object that is controlled by the player during gameplay of the video game.

In other implementations, the virtual viewpoint 602 may be proximate to such an object. In some implementations, the virtual viewpoint 602 may be at a predefined location relative to the original player viewpoint (e.g. providing an over-the-back vantage point). In some implementations, the virtual viewpoint 602 may be located within a region 603 proximate to and/or surrounding the location of the viewpoint of the player during the gameplay of the video game. It will be appreciated that the region 603 can be a three-dimensional region surrounding the player viewpoint. The virtual viewpoint 602 may be permitted to move within the region 603 according to control input, such as movements of an HMD or inputs from other controller devices.

As shown, at time $T_0$, the virtual viewpoint 602 is located at position $P_0$, and affords the player of the video game a view of the virtual environment 600 indicated by the angle 604. However, a wide FOV rendering of the player's gameplay for spectating makes available for spectating a greater field of view, indicated by the angle 606, than that of the player. Thus, additional regions 608 of the virtual environment 600 are available for viewing during spectating by a spectator. This means that the spectator may be able to view content from the virtual environment 600 that was not seen by the original player during gameplay. For example, at time $T_0$ when the location of the virtual viewpoint 602 is at $P_0$, the original player may have only seen a portion 612 of an object 610 in the virtual environment 600. However, because of the wide FOV rendering that is available to the spectator, the spectator may see an additional portion 614 of the object 610 if the spectator turns his/her view direction to the right, so as to deviate from the view direction of the original player. The original player was not able to see this additional portion 614 of the object 610.

At a subsequent time $T_1$, the viewpoint 602 was moved (e.g. as a result of the player moving his/her character in a forward direction) to position $P_1$, and thus the field of view of the player is shown by the angle 616 and the field of view that is available to the spectator is shown by the angle 618. At a further subsequent time T2, the viewpoint 602 was moved to position P2 (e.g. as a result of the player turning his/her character to the right), and thus the field of view of the player is shown by the angle 620 and the field of view available to the spectator is shown by the angle 622. An object 624 is located in the region 626 that is part of the available field of view for the spectator, but was not seen in the field of view of the player.

In some implementations discussed herein, the field of view of the hardware devices used by the player and the spectator are the same, such as when both use HMD's for gameplay/spectating. However, it will be appreciated that in some implementations, the field of view of the player may be smaller than that of the spectator, such as when the player views the video game on a television, and when the spectator views the player's gameplay using an HMD. In this case, then the spectator's field of view will already enable the spectator to see more than the player sees, and in accordance with the expanded FOV video contemplated above, the spectator will also be able change his/her view direction to see additional portions of content.

In some implementations which have been discussed, the viewed portion of the expanded (e.g. 150 degree) rendering is shifted to display different portions of the expanded rendering in response to movement of the spectator's head. However, when a spectator turns his/her head, the spectator's eyes are rotated about some axis. Therefore, to produce a more faithful rendering in response to spectator head movement, in some implementations, a specialized build of the game can be running live (e.g. in the cloud) that uses head tracking information to render the spectator view.

Figure 7:
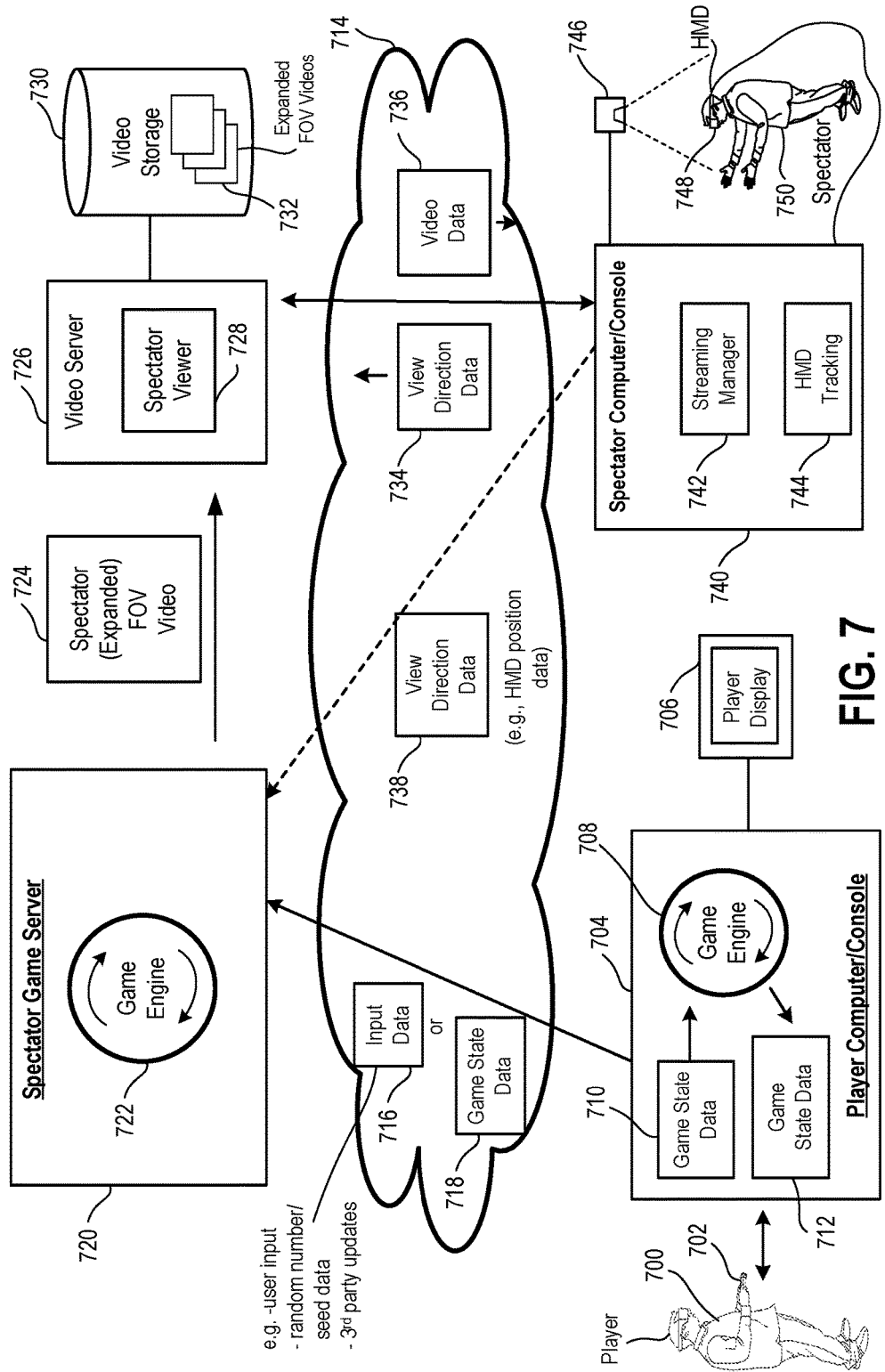
FIG. 7 illustrates a system for providing a wide field of view for spectating on a HMD.

FIG. 7 illustrates a system for rendering video for a spectator, including the ability for the spectator to view portions of the video game scene which are additional to that which was originally viewed by the original player, in accordance with implementations of the disclosure. A player 700 plays a video game that executes on a player computer 704. The executing video game defines a game engine 708 that processes input data 710 received from one or more input devices, such as a controller 702 operated by the player 700. The game engine 708 generates video content that is rendered to a player display 706, which may be an HMD, television, or other type of display.

It should be understood that the video game has a game state associated with it. But of that state, from frame to frame, usually only a subset of it changes, and much of it will change based on controller input, for instance. Thus if the algorithms of the video game are deterministic, then if the random seed being used for the video game (e.g. video game uses random numbers generated by a pseudo-random number generator) is shared, then a spectator version of the video game could run the same game as the player. Such an implementation is shown with continued reference to FIG. 7. A spectator version of the video game is executed on a spectator game server 720. The executing spectator version of the video game defines a game engine 722 that may process input data 716 and/or game state data 718 received over network 714 from the player computer 704. Beginning with the same random seed as the player version of the video game, as long as the spectator version of the video game is provided with the same inputs, then the spectator version of the video game will produce the same output as the player's game.

Thus, the game engine 722 can produce the same output as the game engine 708 when provided with the same inputs. In the illustrated implementation, the game engine 722 receives input data 716, which may include the input data 710 received by the game engine 708 (e.g. the input data 710 being generated from user input received by a controller device 702), and may further include random number/seed data from the game engine 708. In some implementations, the game engine 722 may receive game state data 718 from the game engine 708, which may be applied by the game engine 722 to directly update its game state.

Thus, if the game is deterministic, then the only state that a spectator 750 will require to be able to spectate exactly what the player 700 is seeing, is the inputs that went into the game and a random seed. Such an implementation is advantageous as it requires much less data bandwidth than, for example, streaming 1080p video at 60 Hz/120 Hz. If a spectator version of the same video game as that of the player is provided, and the game is at least substantially deterministic, then the spectator can spectate with much smaller data, because only the data that is required to update the game state is streamed. Thus for purposes of game streaming, the player's version of the video game can send updates of the game state, rather than broadcasting video. Then the server running the spectator's (substantially) duplicate copy of the video game could reproduce what the player saw on-screen, and even provide for novel viewpoints that were not generated during the original gameplay.

The following are examples of types of inputs that affect game state: (1) player input—e.g. controller input (button presses, joystick movement, motion controller movement, etc.); (2) random number inputs—could either send all random numbers chosen; or if server has the same random number generating algorithm as the player's system, then only need to provide seed data, and then server will generate same sequence of random numbers, assuming it is a pseudo-random number algorithm; (3) third party inputs—e.g. when playing a network game (e.g. every frame, a player may receive updates about where the enemies or other players are located). All of these are inputs that could be provided to the spectator game server 720 to enable the spectator game engine 722 to reproduce the game state that the player 700 has or had on their player computer 704.

Alternatively, player's computer 704 could be configured to concisely package up the internal game state (which would also use considerably less than 1080p bandwidth), and send the packaged internal game state to the spectator game server 720. The game state has the interpretive outcome of the inputs, as processed by the game engine 708. For example, when player pushes forward on controller, the outcome may be that the character moved x units of distance, and the game state would thus indicate that the character moved x units of distance.

Thus, the player's version of the game could send its game state, or could send the input data that affected the game state and have the spectator game server 720 on the other end reproduce the game state (e.g. send button pushes so that the spectator game server 720 pushes the same buttons for the spectator). If only the input data that affects the game state is sent, then the game should be at least somewhat deterministic, such that for the same inputs, the spectator's version of the video game will yield substantially the same outputs.

In some implementations, inputs may further include items such as a scheduling engine for multi-threaded processing. For example, in a multi-threaded game, if the system performs operation A before operation B, it may result in a different outcome than if it performed operation B before performing operation A. As an example, if operation A entails updating the position of the player, and operation B entails running the artificial intelligence (AI) of an enemy, it could be that when one moves the position of the player's character first, then the enemy can see him because he moved into the enemy's view; so now the enemy might turn and start shooting. However, on the other hand if the enemy is first updated before the player's character, then the enemy can't see the player yet because the player is still out of the enemy's view.

Thus, as the order of performance of certain operations may impact the game state outcome, then the inputs provided to the spectator game server 720 may include data for scheduling of multi-threaded processing. So to reproduce game state based on inputs, the game should be deterministic to a certain extent, and inputs may include the order in which certain operations are performed, to help make the system more deterministic. An advantage of these systems is to reduce the amount of data required to be sent up to the server for spectating purposes.

The game engine 722 on the spectator game server 720 renders an expanded (e.g. 150 degree) field of view (FOV) gameplay video 724 based on the received input data 716 or game state data 718 from the player's computer system 704. In accordance with implementations discussed above, the spectator can look beyond what the player was originally looking at. For example, the spectator computer 740 may include a streaming manager 742 for managing streaming playback of a portion of the expanded FOV video 724. The spectator computer 740 includes an HMD tracking module 744 configured to track the pose of the HMD 748 worn by the spectator 750, e.g. based (at least in part) on captured image data from a camera 746 that captures images of the HMD 748 during spectating. The spectator computer 740 may send view direction data 734 indicating the view direction of the spectator 750 to the video server 726. A spectator viewer application 728 processes the view direction data 734 to define the field of view for the spectator, and generates and sends the appropriate video data 736 to streaming manager 742 of the spectator computer 740 for rendering to the HMD 748.

It will be appreciated that in some implementations, the input data 716 and/or game state data 718 can be uploaded to the spectator game server 720 for live streaming Whereas in other implementations, the input data and/or game state data can be uploaded and stored for later use.

Thus, in some implementations, the player system 704 sends game state updates to the spectator game server 720. The spectator game server 720 renders video in stereo (for HMD spectating; e.g. original gameplay may have been on regular non-HMD (non-stereo) display) with a super-wide expanded field of view. A subset view of the expanded field of view is streamed to the spectator computer 740, as determined based on view direction data 734. In other implementations, static (stereoscopic) expanded FOV video 732 can be stored to a video storage 730 for later spectator viewing.

However, in other implementations, the view direction data 738 of the spectator 750 (e.g. HMD pose data) can be sent to the spectator game server 722, which processes the view direction data 738 to directly generate, by execution of the game engine 722 using the view direction data 738, the appropriate video content for the spectator's field of view. With reference to FIG. 7, such a video can be streamed by the video server 726 to the spectator computer 740 for rendering to the HMD 748. In such implementations, rendering of regions beyond the spectator's field of view are not required, as the spectator's view direction is already accounted for by the spectator game server's 720 execution of the video game.

Furthermore, the video content generated for the spectator's field of view can be rendered at higher fidelity than that viewed by the original player. For example, the spectator's video can be rendered at higher frame rates, increased detail levels, greater interpolated motion, etc. that provides for a higher fidelity viewing experience of the video game. This may especially be the case when rendering spectator views that differ from those of the original player. For in the player's session, the graphical fidelity of certain portions of the player's field of view may not have been prioritized, e.g. in favor of other portions. But for the spectator's view, and especially if the spectator is looking at such portions, then their graphical fidelity may be increased and/or prioritized for the spectator video.

In some implementations, instead of saving a wide FOV rendering, the game state is saved. That is, the spectator game server 720 archives the game state itself. The spectator computer 740 can connect to the spectator game server 720 and send view direction data 738 (e.g. head-tracking information such as position/pose data of the spectator's eyes/HMD) to the spectator game server 720. The spectator game server may process the head-tracking information of the spectator and the game state of the player, and re-render the outcome of the player's actions from the spectator's perspective. So the rendering can be performed live or on-demand. The game state of the game engine 722 is updated in real-time based on the archive of the game state but the rendering is done based on the viewpoint of the spectator, which allows for wholly new viewpoints.

In some implementations, a pause feature is provided, wherein a spectator may stop the updating of the game state, but the spectator is still able to adjust their view of the virtual space, or even able to move to new locations within the virtual space and examine the virtual space from different perspectives.

In some implementations, the spectator may move to a different location from that of the player within the virtual space of the game. This can provide interesting views that were not previously generated. But in some cases, this could be less than ideal if the spectator strays too far from the main player character (e.g. AI character might be inactive b/c not triggered yet), as some games may not be interesting if viewed from too far away from the main player character. However, if entire game world is always live, then this could provide interesting experiences for the spectator.

Implementations providing for re-rendering of the video game can provide a more faithful 3D experience, because when the spectator moves or turns his/her head, it is possible to provide all the parallax effects etc. of head movement and rotation. When the spectator's head is moved and rotated, it is possible to provide the correct image that accounts for the translated and rotated head position/orientation of the spectator. It is further possible to render the correct image for the spectator's eye pupil distance (distance between eyes), and render for the specific model of HMD that the spectator has.

Re-rendering can happen either in the cloud or local to the spectator (e.g. spectator computer). One benefit of performing the re-rendering locally to the spectator is that this requires streaming of only the input data or game state, which requires less data bandwidth than streaming video. A second advantage of performing the re-rendering locally is that the latency between a detected change in the spectator HMD pose and the provision of re-rendered visuals that are responsive to such a change can be significantly reduced.

In some implementations, wide/expanded FOV rendering can be performed in the cloud, so that video can be stored, and then a subset view of the wide/expanded FOV can be streamed to the spectator.

It will be appreciated that in some implementations, modifications to a video game may be performed to allow for the functionality identified herein.

The player's game build (which may be an HMD or non-HMD game), may be modified to stream out the game state so that it periodically uploads game state data to the cloud (e.g. 120 times/sec). The time period is flexible in terms of how often updates are sent, and the rate of the updates themselves; e.g. could send game state increments that are $1/60^{th}$ second, but could package up 60 of them and send them 1 second at a time; or could send game state increments that are every ten frames, so send $1/10^{th}$ of the game state updates, and flag some of the game state elements as needing to be interpolated over ten frames.

Thus, the game build may be coded to interpolate some things but not other things. There may be certain data that should be sent every frame's worth, whereas other data may be interpolated and therefore $1/10^{th}$ of data is sent and cloud system interpolates the rest. For example, if sharing actual game state, it could be very important to know where the player is and which way he's facing, so every frame's worth of data for that is sent; on the other hand, if somebody shoots a gun and there's a bullet that travels across the screen, the bullet might travel in a straight line so the game build might be configured to give 1 out of every 10 frames' worth of data for the bullet's position, and expect that the rest will be interpolated. So it is possible to have different data rates for different things. The decision of which data rates to apply for which things could be determined from a lookup table.

The spectator's game build may be configured to execute in the cloud or on a local spectator machine. In implementations wherein game state data is provided by the player's game build, then the portion of the game which updates game state is not required for the spectator's build because it is receiving these updated states already, and is going to render the spectator's view based on them.

With the above modifications to the game builds for the player's game build and the spectator's game build, it is possible to provide very high quality reproductions of what original player saw, because it is the actual game doing reproduction.

Implementations of the present disclosure provide advantages in that the player's system uploading the game stream doesn't need to upload the entire video, but can upload game state information and either the cloud server or spectator's console can accept that game state and render the image. In the case of a cloud server, then the cloud server renders the video and streams it down to the spectator. If rendering is not performed by the cloud server, then the cloud server simply distributes the game state to spectator console.

In some cloud-gaming implementations, player inputs are sent to a cloud gaming server which takes those inputs and runs the game and renders the video and streams it back to the player. In this case, the spectator receives the video stream, and the spectator could have additional input that indicates which way the spectator is looking. So the server can receive input from both the player and the spectator (e.g. camera direction from spectator and input from player) and then renders the game and sends it to the spectator.

Figure 8:
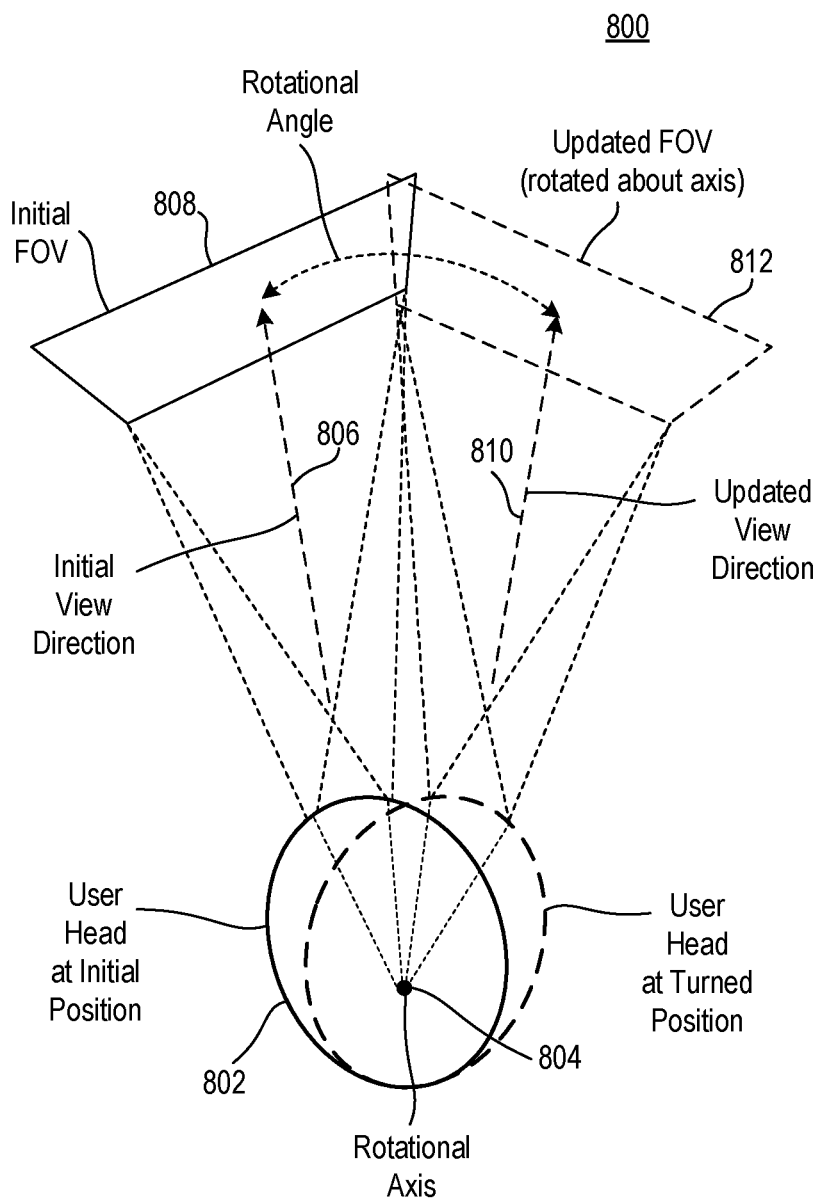
FIG. 8 illustrates an overhead view of a user rotating his head, and the accompanying change in the field of view.

FIG. 8 illustrates an overhead view of a (spectator) user's head in the context of a virtual space of a video game, demonstrating changes in the user's view of the virtual space, in accordance with implementations of the disclosure. The user's head 802 is shown at an initial pose (location and orientation) that defines the user's viewpoint in the virtual space as well as an initial view direction (ref. 806) in the virtual space. Therefore, at the initial pose of the user's head, the user is provided with an initial field of view 808 of the virtual space 800. As has been noted, the pose of the user's head can be determined from various head tracking methods, including tracking the pose of an HMD worn by the user, analyzing captured images of the user's head in the user's real environment, tracking other objects/sensors on the user's head, etc.

In the illustrated implementation, the user turns his head, and so defines an updated view direction 810 in the virtual space 800. In some implementations, the user may rotate his head about a rotational axis 804, whereas in other implementations, the user may (additionally or alternatively) move his head in a translational manner Thus, the viewpoint may change, and the view direction changes to an updated view direction 810. Accordingly, the user's view has rotated by a rotational angle to an updated field of view 812.

In order to generate such an updated field of view 812 when the user (spectator) is spectating a player's gameplay, the pose information of the spectator's head is tracked and communicated to the spectator version of the video game, which executes and processes the pose information to generate the updated field of view 812. The spectator is thus able to view portions of the virtual space that are different from that of the player's view, while spectating the player's gameplay session.

Figure 9:
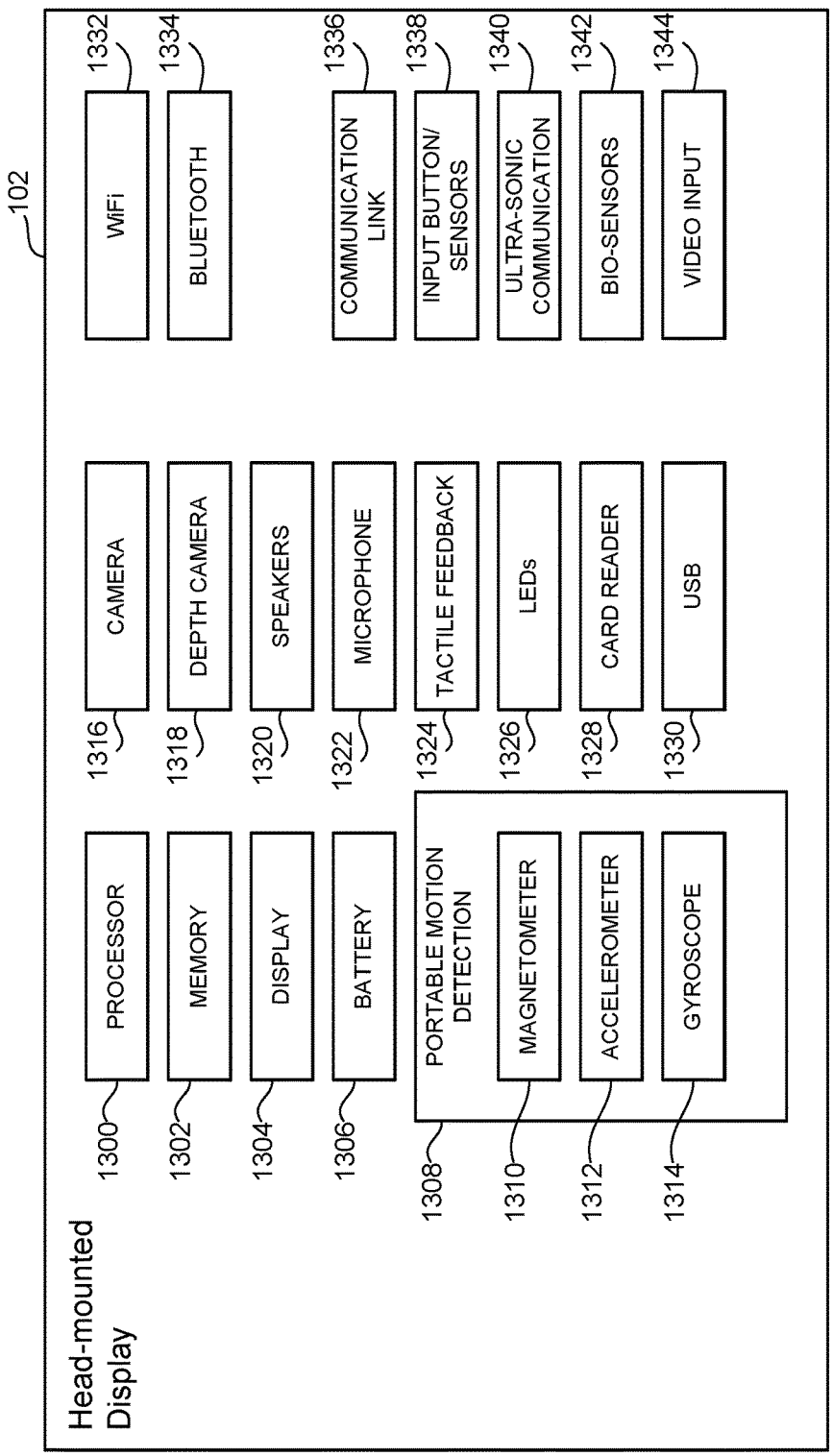
FIG. 9 illustrates components of a head-mounted display, in accordance with an embodiment of the disclosure.

With reference to FIG. 9, a diagram illustrating components of a head-mounted display 102 is shown, in accordance with an embodiment of the disclosure. The head-mounted display 102 includes a processor 1300 for executing program instructions. A memory 1302 is provided for storage purposes, and may include both volatile and non-volatile memory. A display 1304 is included which provides a visual interface that a user may view. A battery 1306 is provided as a power source for the head-mounted display 102. A motion detection module 1308 may include any of various kinds of motion sensitive hardware, such as a magnetometer 1310, an accelerometer 1312, and a gyroscope 1314.

An accelerometer is a device for measuring acceleration and gravity induced reaction forces. Single and multiple axis models are available to detect magnitude and direction of the acceleration in different directions. The accelerometer is used to sense inclination, vibration, and shock. In one embodiment, three accelerometers 1312 are used to provide the direction of gravity, which gives an absolute reference for two angles (world-space pitch and world-space roll).

A magnetometer measures the strength and direction of the magnetic field in the vicinity of the head-mounted display. In one embodiment, three magnetometers 1310 are used within the head-mounted display, ensuring an absolute reference for the world-space yaw angle. In one embodiment, the magnetometer is designed to span the earth magnetic field, which is ±80 microtesla. Magnetometers are affected by metal, and provide a yaw measurement that is monotonic with actual yaw. The magnetic field may be warped due to metal in the environment, which causes a warp in the yaw measurement. If necessary, this warp can be calibrated using information from other sensors such as the gyroscope or the camera. In one embodiment, accelerometer 1312 is used together with magnetometer 1310 to obtain the inclination and azimuth of the head-mounted display 102.

In some implementations, the magnetometers of the head-mounted display are configured so as to be read during times when electromagnets in other nearby devices are inactive.

A gyroscope is a device for measuring or maintaining orientation, based on the principles of angular momentum. In one embodiment, three gyroscopes 1314 provide information about movement across the respective axis (x, y and z) based on inertial sensing. The gyroscopes help in detecting fast rotations. However, the gyroscopes can drift overtime without the existence of an absolute reference. This requires resetting the gyroscopes periodically, which can be done using other available information, such as positional/orientation determination based on visual tracking of an object, accelerometer, magnetometer, etc.

A camera 1316 is provided for capturing images and image streams of a real environment. More than one camera may be included in the head-mounted display 102, including a camera that is rear-facing (directed away from a user when the user is viewing the display of the head-mounted display 102), and a camera that is front-facing (directed towards the user when the user is viewing the display of the head-mounted display 102). Additionally, a depth camera 1318 may be included in the head-mounted display 102 for sensing depth information of objects in a real environment.

The head-mounted display 102 includes speakers 1320 for providing audio output. Also, a microphone 1322 may be included for capturing audio from the real environment, including sounds from the ambient environment, speech made by the user, etc. The head-mounted display 102 includes tactile feedback module 1324 for providing tactile feedback to the user. In one embodiment, the tactile feedback module 1324 is capable of causing movement and/or vibration of the head-mounted display 102 so as to provide tactile feedback to the user.

LEDs 1326 are provided as visual indicators of statuses of the head-mounted display 102. For example, an LED may indicate battery level, power on, etc. A card reader 1328 is provided to enable the head-mounted display 102 to read and write information to and from a memory card. A USB interface 1330 is included as one example of an interface for enabling connection of peripheral devices, or connection to other devices, such as other portable devices, computers, etc. In various embodiments of the head-mounted display 102, any of various kinds of interfaces may be included to enable greater connectivity of the head-mounted display 102.

A WiFi module 1332 is included for enabling connection to the Internet or a local area network via wireless networking technologies. Also, the head-mounted display 102 includes a Bluetooth module 1334 for enabling wireless connection to other devices. A communications link 1336 may also be included for connection to other devices. In one embodiment, the communications link 1336 utilizes infrared transmission for wireless communication. In other embodiments, the communications link 1336 may utilize any of various wireless or wired transmission protocols for communication with other devices.

Input buttons/sensors 1338 are included to provide an input interface for the user. Any of various kinds of input interfaces may be included, such as buttons, touchpad, joystick, trackball, etc. An ultra-sonic communication module 1340 may be included in head-mounted display 102 for facilitating communication with other devices via ultrasonic technologies.

Bio-sensors 1342 are included to enable detection of physiological data from a user. In one embodiment, the bio-sensors 1342 include one or more dry electrodes for detecting bio-electric signals of the user through the user's skin.

A video input 1344 is configured to receive a video signal from a primary processing computer (e.g. main game console) for rendering on the HMD. In some implementations, the video input is an HDMI input.

The foregoing components of head-mounted display 102 have been described as merely exemplary components that may be included in head-mounted display 102. In various embodiments of the disclosure, the head-mounted display 102 may or may not include some of the various aforementioned components. Embodiments of the head-mounted display 102 may additionally include other components not presently described, but known in the art, for purposes of facilitating aspects of the present disclosure as herein described.

Figure 10:
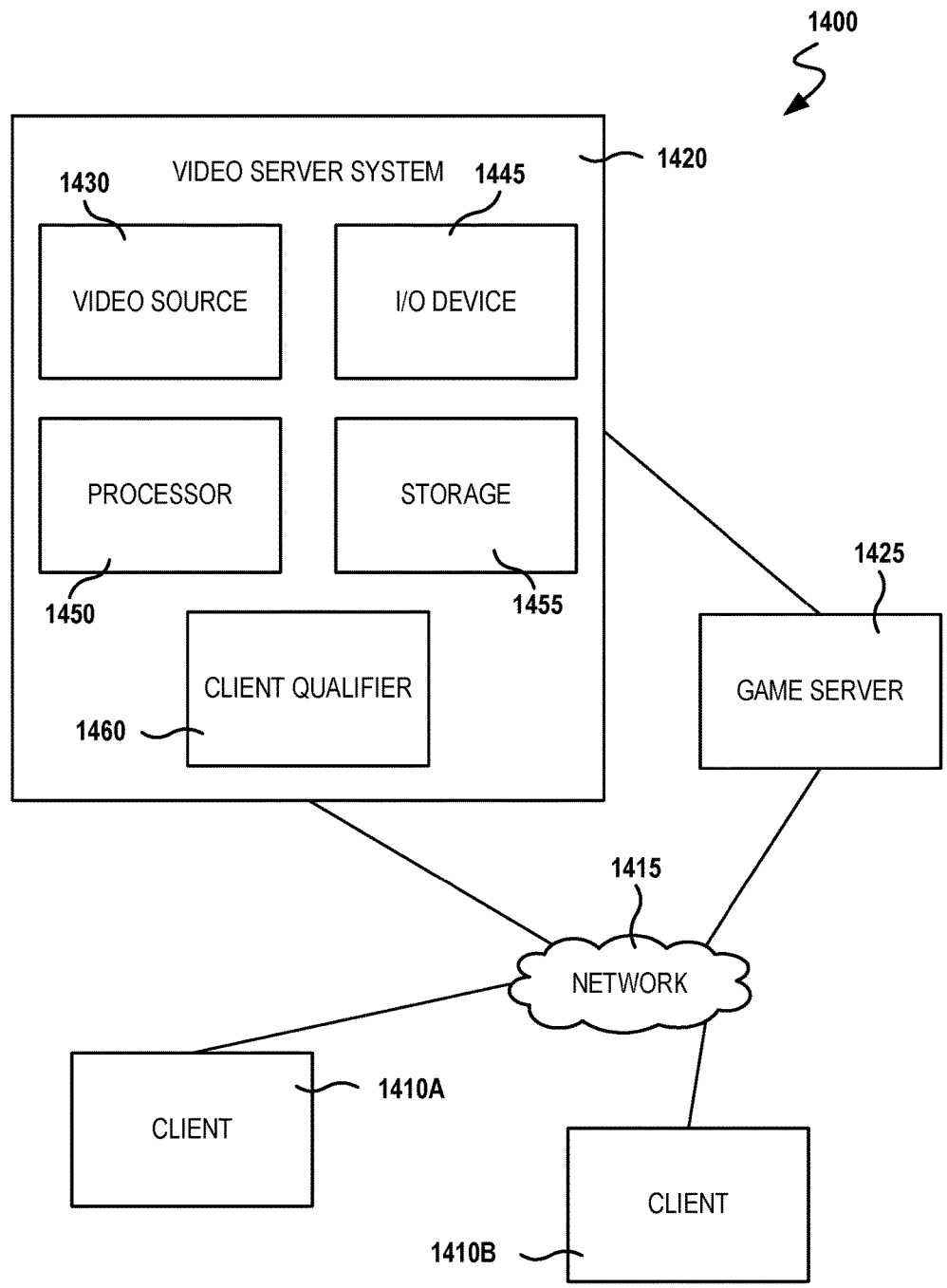
FIG. 10 is a block diagram of a Game System 1400, according to various embodiments of the disclosure.

FIG. 10 is a block diagram of a Game System 1400, according to various embodiments of the disclosure. Game System 1400 is configured to provide a video stream to one or more Clients 1410 via a Network 1415. Game System 1400 typically includes a Video Server System 1420 and an optional game server 1425. Video Server System 1420 is configured to provide the video stream to the one or more Clients 1410 with a minimal quality of service. For example, Video Server System 1420 may receive a game command that changes the state of or a point of view within a video game, and provide Clients 1410 with an updated video stream reflecting this change in state with minimal lag time. The Video Server System 1420 may be configured to provide the video stream in a wide variety of alternative video formats, including formats yet to be defined. Further, the video stream may include video frames configured for presentation to a user at a wide variety of frame rates. Typical frame rates are 30 frames per second, 60 frames per second, and 120 frames per second. Although higher or lower frame rates are included in alternative embodiments of the disclosure.

Clients 1410, referred to herein individually as 1410A, 1410B, etc., may include head mounted displays, terminals, personal computers, game consoles, tablet computers, telephones, set top boxes, kiosks, wireless devices, digital pads, stand-alone devices, handheld game playing devices, and/or the like. Typically, Clients 1410 are configured to receive encoded video streams, decode the video streams, and present the resulting video to a user, e.g., a player of a game. The processes of receiving encoded video streams and/or decoding the video streams typically includes storing individual video frames in a receive buffer of the client. The video streams may be presented to the user on a display integral to Client 1410 or on a separate device such as a monitor or television. Clients 1410 are optionally configured to support more than one game player. For example, a game console may be configured to support two, three, four or more simultaneous players. Each of these players may receive a separate video stream, or a single video stream may include regions of a frame generated specifically for each player, e.g., generated based on each player's point of view. Clients 1410 are optionally geographically dispersed. The number of clients included in Game System 1400 may vary widely from one or two to thousands, tens of thousands, or more. As used herein, the term "game player" is used to refer to a person that plays a game and the term "game playing device" is used to refer to a device used to play a game. In some embodiments, the game playing device may refer to a plurality of computing devices that cooperate to deliver a game experience to the user. For example, a game console and an HMD may cooperate with the video server system 1420 to deliver a game viewed through the HMD. In one embodiment, the game console receives the video stream from the video server system 1420, and the game console forwards the video stream, or updates to the video stream, to the HMD for rendering.

Clients 1410 are configured to receive video streams via Network 1415. Network 1415 may be any type of communication network including, a telephone network, the Internet, wireless networks, powerline networks, local area networks, wide area networks, private networks, and/or the like. In typical embodiments, the video streams are communicated via standard protocols, such as TCP/IP or UDP/IP. Alternatively, the video streams are communicated via proprietary standards.

A typical example of Clients 1410 is a personal computer comprising a processor, non-volatile memory, a display, decoding logic, network communication capabilities, and input devices. The decoding logic may include hardware, firmware, and/or software stored on a computer readable medium. Systems for decoding (and encoding) video streams are well known in the art and vary depending on the particular encoding scheme used.

Clients 1410 may, but are not required to, further include systems configured for modifying received video. For example, a client may be configured to perform further rendering, to overlay one video image on another video image, to crop a video image, and/or the like. For example, Clients 1410 may be configured to receive various types of video frames, such as I-frames, P-frames and B-frames, and to process these frames into images for display to a user. In some embodiments, a member of Clients 1410 is configured to perform further rendering, shading, conversion to 3-D, or like operations on the video stream. A member of Clients 1410 is optionally configured to receive more than one audio or video stream. Input devices of Clients 1410 may include, for example, a one-hand game controller, a two-hand game controller, a gesture recognition system, a gaze recognition system, a voice recognition system, a keyboard, a joystick, a pointing device, a force feedback device, a motion and/or location sensing device, a mouse, a touch screen, a neural interface, a camera, input devices yet to be developed, and/or the like.

The video stream (and optionally audio stream) received by Clients 1410 is generated and provided by Video Server System 1420. As is described further elsewhere herein, this video stream includes video frames (and the audio stream includes audio frames). The video frames are configured (e.g., they include pixel information in an appropriate data structure) to contribute meaningfully to the images displayed to the user. As used herein, the term "video frames" is used to refer to frames including predominantly information that is configured to contribute to, e.g. to effect, the images shown to the user. Most of the teachings herein with regard to "video frames" can also be applied to "audio frames."

Clients 1410 are typically configured to receive inputs from a user. These inputs may include game commands configured to change the state of the video game or otherwise affect game play. The game commands can be received using input devices and/or may be automatically generated by computing instructions executing on Clients 1410. The received game commands are communicated from Clients 1410 via Network 1415 to Video Server System 1420 and/or Game Server 1425. For example, in some embodiments, the game commands are communicated to Game Server 1425 via Video Server System 1420. In some embodiments, separate copies of the game commands are communicated from Clients 1410 to Game Server 1425 and Video Server System 1420. The communication of game commands is optionally dependent on the identity of the command Game commands are optionally communicated from Client 1410A through a different route or communication channel that that used to provide audio or video streams to Client 1410A.

Game Server 1425 is optionally operated by a different entity than Video Server System 1420. For example, Game Server 1425 may be operated by the publisher of a multiplayer game. In this example, Video Server System 1420 is optionally viewed as a client by Game Server 1425 and optionally configured to appear from the point of view of Game Server 1425 to be a prior art client executing a prior art game engine. Communication between Video Server System 1420 and Game Server 1425 optionally occurs via Network 1415. As such, Game Server 1425 can be a prior art multiplayer game server that sends game state information to multiple clients, one of which is game server system 1420. Video Server System 1420 may be configured to communicate with multiple instances of Game Server 1425 at the same time. For example, Video Server System 1420 can be configured to provide a plurality of different video games to different users. Each of these different video games may be supported by a different Game Server 1425 and/or published by different entities. In some embodiments, several geographically distributed instances of Video Server System 1420 are configured to provide game video to a plurality of different users. Each of these instances of Video Server System 1420 may be in communication with the same instance of Game Server 1425. Communication between Video Server System 1420 and one or more Game Server 1425 optionally occurs via a dedicated communication channel. For example, Video Server System 1420 may be connected to Game Server 1425 via a high bandwidth channel that is dedicated to communication between these two systems.

Video Server System 1420 comprises at least a Video Source 1430, an I/O Device 1445, a Processor 1450, and non-transitory Storage 1455. Video Server System 1420 may include one computing device or be distributed among a plurality of computing devices. These computing devices are optionally connected via a communications system such as a local area network.

Video Source 1430 is configured to provide a video stream, e.g., streaming video or a series of video frames that form a moving picture. In some embodiments, Video Source 1430 includes a video game engine and rendering logic. The video game engine is configured to receive game commands from a player and to maintain a copy of the state of the video game based on the received commands. This game state includes the position of objects in a game environment, as well as typically a point of view. The game state may also include properties, images, colors and/or textures of objects. The game state is typically maintained based on game rules, as well as game commands such as move, turn, attack, set focus to, interact, use, and/or the like. Part of the game engine is optionally disposed within Game Server 1425.

Game Server 1425 may maintain a copy of the state of the game based on game commands received from multiple players using geographically disperse clients. In these cases, the game state is provided by Game Server 1425 to Video Source 1430, wherein a copy of the game state is stored and rendering is performed. Game Server 1425 may receive game commands directly from Clients 1410 via Network 1415, and/or may receive game commands via Video Server System 1420.

Video Source 1430 typically includes rendering logic, e.g., hardware, firmware, and/or software stored on a computer readable medium such as Storage 1455. This rendering logic is configured to create video frames of the video stream based on the game state. All or part of the rendering logic is optionally disposed within a graphics processing unit (GPU). Rendering logic typically includes processing stages configured for determining the three-dimensional spatial relationships between objects and/or for applying appropriate textures, etc., based on the game state and viewpoint. The rendering logic produces raw video that is then usually encoded prior to communication to Clients 1410. For example, the raw video may be encoded according to an Adobe Flash® standard, .wav, H.264, H.263, On2, VP6, VC-1, WMA, Huffyuv, Lagarith, MPG-x. Xvid. FFmpeg, x264, VP6-8, realvideo, mp3, or the like. The encoding process produces a video stream that is optionally packaged for delivery to a decoder on a remote device. The video stream is characterized by a frame size and a frame rate. Typical frame sizes include 800×600, 1280×720 (e.g., 720p), 1024×768, although any other frame sizes may be used. The frame rate is the number of video frames per second. A video stream may include different types of video frames. For example, the H.264 standard includes a "P" frame and an "I" frame. I-frames include information to refresh all macro blocks/pixels on a display device, while P-frames include information to refresh a subset thereof. P-frames are typically smaller in data size than are I-frames. As used herein the term "frame size" is meant to refer to a number of pixels within a frame. The term "frame data size" is used to refer to a number of bytes required to store the frame.

In alternative embodiments Video Source 1430 includes a video recording device such as a camera. This camera may be used to generate delayed or live video that can be included in the video stream of a computer game. The resulting video stream optionally includes both rendered images and images recorded using a still or video camera. Video Source 1430 may also include storage devices configured to store previously recorded video to be included in a video stream. Video Source 1430 may also include motion or positioning sensing devices configured to detect motion or position of an object, e.g., person, and logic configured to determine a game state or produce video-based on the detected motion and/or position.

Video Source 1430 is optionally configured to provide overlays configured to be placed on other video. For example, these overlays may include a command interface, log in instructions, messages to a game player, images of other game players, video feeds of other game players (e.g., webcam video). In embodiments of Client 1410A including a touch screen interface or a gaze detection interface, the overlay may include a virtual keyboard, joystick, touch pad, and/or the like. In one example of an overlay a player's voice is overlaid on an audio stream. Video Source 1430 optionally further includes one or more audio sources.

In embodiments wherein Video Server System 1420 is configured to maintain the game state based on input from more than one player, each player may have a different point of view comprising a position and direction of view. Video Source 1430 is optionally configured to provide a separate video stream for each player based on their point of view. Further, Video Source 1430 may be configured to provide a different frame size, frame data size, and/or encoding to each of Client 1410. Video Source 1430 is optionally configured to provide 3-D video.

I/O Device 1445 is configured for Video Server System 1420 to send and/or receive information such as video, commands, requests for information, a game state, gaze information, device motion, device location, user motion, client identities, player identities, game commands, security information, audio, and/or the like. I/O Device 1445 typically includes communication hardware such as a network card or modem. I/O Device 1445 is configured to communicate with Game Server 1425, Network 1415, and/or Clients 1410.

Processor 1450 is configured to execute logic, e.g. software, included within the various components of Video Server System 1420 discussed herein. For example, Processor 1450 may be programmed with software instructions in order to perform the functions of Video Source 1430, Game Server 1425, and/or a Client Qualifier 1460. Video Server System 1420 optionally includes more than one instance of Processor 1450. Processor 1450 may also be programmed with software instructions in order to execute commands received by Video Server System 1420, or to coordinate the operation of the various elements of Game System 1400 discussed herein. Processor 1450 may include one or more hardware device. Processor 1450 is an electronic processor.

Storage 1455 includes non-transitory analog and/or digital storage devices. For example, Storage 1455 may include an analog storage device configured to store video frames. Storage 1455 may include a computer readable digital storage, e.g. a hard drive, an optical drive, or solid state storage. Storage 1415 is configured (e.g. by way of an appropriate data structure or file system) to store video frames, artificial frames, a video stream including both video frames and artificial frames, audio frame, an audio stream, and/or the like. Storage 1455 is optionally distributed among a plurality of devices. In some embodiments, Storage 1455 is configured to store the software components of Video Source 1430 discussed elsewhere herein. These components may be stored in a format ready to be provisioned when needed.

Video Server System 1420 optionally further comprises Client Qualifier 1460. Client Qualifier 1460 is configured for remotely determining the capabilities of a client, such as Clients 1410A or 1410B. These capabilities can include both the capabilities of Client 1410A itself as well as the capabilities of one or more communication channels between Client 1410A and Video Server System 1420. For example, Client Qualifier 1460 may be configured to test a communication channel through Network 1415.

Client Qualifier 1460 can determine (e.g., discover) the capabilities of Client 1410A manually or automatically. Manual determination includes communicating with a user of Client 1410A and asking the user to provide capabilities. For example, in some embodiments, Client Qualifier 1460 is configured to display images, text, and/or the like within a browser of Client 1410A. In one embodiment, Client 1410A is an HMD that includes a browser. In another embodiment, client 1410A is a game console having a browser, which may be displayed on the HMD. The displayed objects request that the user enter information such as operating system, processor, video decoder type, type of network connection, display resolution, etc. of Client 1410A. The information entered by the user is communicated back to Client Qualifier 1460.

Automatic determination may occur, for example, by execution of an agent on Client 1410A and/or by sending test video to Client 1410A. The agent may comprise computing instructions, such as java script, embedded in a web page or installed as an add-on. The agent is optionally provided by Client Qualifier 1460. In various embodiments, the agent can find out processing power of Client 1410A, decoding and display capabilities of Client 1410A, lag time reliability and bandwidth of communication channels between Client 1410A and Video Server System 1420, a display type of Client 1410A, firewalls present on Client 1410A, hardware of Client 1410A, software executing on Client 1410A, registry entries within Client 1410A, and/or the like.

Client Qualifier 1460 includes hardware, firmware, and/or software stored on a computer readable medium. Client Qualifier 1460 is optionally disposed on a computing device separate from one or more other elements of Video Server System 1420. For example, in some embodiments, Client Qualifier 1460 is configured to determine the characteristics of communication channels between Clients 1410 and more than one instance of Video Server System 1420. In these embodiments the information discovered by Client Qualifier can be used to determine which instance of Video Server System 1420 is best suited for delivery of streaming video to one of Clients 1410.

Embodiments of the present disclosure may be practiced with various computer system configurations including hand-held devices, microprocessor systems, microprocessor-based or programmable consumer electronics, minicomputers, mainframe computers and the like. The disclosure can also be practiced in distributed computing environments where tasks are performed by remote processing devices that are linked through a wire-based or wireless network.

With the above embodiments in mind, it should be understood that the disclosure can employ various computer-implemented operations involving data stored in computer systems. These operations are those requiring physical manipulation of physical quantities. Any of the operations described herein that form part of the disclosure are useful machine operations. The disclosure also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The disclosure can also be embodied as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing disclosure has been described in some detail for purposes of clarity of understanding, it will be apparent that certain changes and modifications can be practiced within the scope of the appended claims. Accordingly, the present embodiments are to be considered as illustrative and not restrictive, and the disclosure is not to be limited to the details given herein, but may be modified within the scope and equivalents of the present disclosure.

What is claimed is:

1. A method, comprising:
receiving, by a gaming server, game state data from a player client device, the game state data being defined from a first game state of a first instance of a video game that is executed by the player client device, the first instance of the video game being executed to render interactive gameplay of the video game;
applying, by the gaming server, the received game state data as input to a second instance of the video game that is executed by the gaming server, the second instance of the video game processing the game state data to generate a second game state that is used to render a wide field of view (FOV) spectator video of the interactive gameplay of the video game;
receiving, by a video server, view direction data from a spectator client device, the view direction data being determined from a tracked pose of a head-mounted display (HMD);
applying, by the video server, the view direction data to identify a portion of the wide FOV spectator video, the portion of the wide FOV spectator video being a sub-area of the wide FOV spectator video that is less than an entire area of the wide FOV spectator video;
streaming the portion of the wide FOV spectator video to the spectator client device for rendering on the HMD.

2. The method of claim 1, wherein the game state data includes one or more of, input data defined from a controller device that is in communication with the player client device, one or more values of one or more game state variables, a random or pseudo-random seed, updates to a state of an object or property.

3. The method of claim 1, wherein applying the game state data to the second instance of the video game produces a game state of the second instance of the video game that is similar to the game state of the first instance of the video game.

4. The method of claim 1, wherein the wide FOV spectator video has a field of view that is greater than a field of view of a primary video that was rendered from the first instance of the video game by the player client device.

5. The method of claim 1, wherein the view direction data identifies an orientation of the HMD in a spectator environment in which the HMD is disposed.

6. The method of claim 5, wherein the tracked pose of the HMD is determined from at least one inertial sensor of the HMD and/or from analysis of captured images of the spectator environment.

7. The method of claim 1,
wherein the wide FOV spectator video is stored to a storage device;

wherein applying the view direction data includes retrieving the wide FOV spectator video from the storage device.

8. The method of claim 1, wherein operations of the method are performed in substantial real-time, so that the rendering of the portion of the wide FOV spectator video on the HMD enables live spectating of the first instance of the video game.

9. A method, comprising:
receiving, by a gaming server, game state data from a player client device, the game state data being defined from a first game state of a first instance of a video game that is executed by the player client device, the first instance of the video game being executed to render interactive gameplay of the video game;
receiving, by the gaming server, view direction data from a spectator client device, the view direction data being determined from a tracked pose of a head-mounted display (HMD);
applying, by the gaming server, the received game state data and the view direction data as inputs to a second instance of the video game that is executed by the gaming server, the second instance of the video game processing the game state data to generate a second game state that is used to render a spectator video of the interactive gameplay of the video game;
streaming the spectator video to the spectator client device for rendering on the HMD.

10. The method of claim 9, wherein the game state data includes one or more of, input data defined from a controller device that is in communication with the player client device, one or more values of one or more game state variables, a random or pseudo-random seed, updates to a state of an object or property.

11. The method of claim 9, wherein applying the game state data to the second instance of the video game produces a game state of the second instance of the video game that is similar to the game state of the first instance of the video game.

12. The method of claim 9, wherein the spectator video has a field of view that is greater than a field of view of a primary video that was rendered from the first instance of the video game by the player client device.

13. The method of claim 9, wherein the view direction data identifies an orientation of the HMD in a spectator environment in which the HMD is disposed.

14. The method of claim 13, wherein the tracked pose of the HMD is determined from at least one inertial sensor of the HMD and/or from analysis of captured images of the spectator environment.

15. The method of claim 9, wherein operations of the method are performed in substantial real-time, so that the rendering of the spectator video on the HMD enables live spectating of the first instance of the video game.

16. A system, comprising:
at least one server computer having at least one processor and at least one memory, the at least one server computer including a gaming server and a video server;
wherein the gaming server is configured to receive game state data from a player client device, the game state data being defined from a first game state of a first instance of a video game that is executed by the player client device, the first instance of the video game being executed to render interactive gameplay of the video game;
wherein the gaming server is further configured to apply the received game state data as input to a second instance of the video game that is executed by the gaming server, the second instance of the video game processing the game state data to generate a second game state that is used to render a wide field of view (FOV) spectator video of the interactive gameplay of the video game;
wherein the video server is configured to receive view direction data from a spectator client device, the view direction data being determined from a tracked pose of a head-mounted display (HMD);
wherein the video server is further configured to apply the view direction data to identify a portion of the wide FOV spectator video, the portion of the wide FOV spectator video being a sub-area of the wide FOV spectator video that is less than an entire area of the wide FOV spectator video;
wherein the video server is further configured to stream the portion of the wide FOV spectator video to the spectator client device for rendering on the HMD.

17. The system of claim 16, wherein the game state data includes one or more of, input data defined from a controller device that is in communication with the player client device, one or more values of one or more game state variables, a random or pseudo-random seed, updates to a state of an object or property.

18. The system of claim 16, wherein applying the game state data to the second instance of the video game produces a game state of the second instance of the video game that is similar to the game state of the first instance of the video game.

19. The system of claim 16, wherein the wide FOV spectator video has a field of view that is greater than a field of view of a primary video that was rendered from the first instance of the video game by the player client device.

20. The system of claim 16,
wherein the view direction data identifies an orientation of the HMD in a spectator environment in which the HMD is disposed;
wherein the tracked pose of the HMD is determined from at least one inertial sensor of the HMD and/or from analysis of captured images of the spectator environment.

* * * * *